(12) United States Patent
Ishiwata et al.

(10) Patent No.: US 11,934,901 B2
(45) Date of Patent: Mar. 19, 2024

(54) TAG

(71) Applicant: Konica Minolta, Inc., Tokyo (JP)

(72) Inventors: Takumi Ishiwata, Mitaka (JP); Nobuaki Takahashi, Tama (JP); Kenji Arai, Kunitachi (JP); Takeshi Hakii, Sagamihara (JP)

(73) Assignee: Konica Minolta, Inc., Tokyo (JP)

( * ) Notice: Subject to any disclaimer, the term of this patent is extended or adjusted under 35 U.S.C. 154(b) by 99 days.

(21) Appl. No.: 17/632,416

(22) PCT Filed: Aug. 21, 2020

(86) PCT No.: PCT/JP2020/031705
§ 371 (c)(1),
(2) Date: Feb. 2, 2022

(87) PCT Pub. No.: WO2021/039662
PCT Pub. Date: Mar. 4, 2021

(65) Prior Publication Data
US 2022/0284256 A1    Sep. 8, 2022

(30) Foreign Application Priority Data

Aug. 26, 2019  (JP) .................................. 2019-154062

(51) Int. Cl.
*G06K 19/077* (2006.01)
*G06K 19/07* (2006.01)

(52) U.S. Cl.
CPC ... *G06K 19/07758* (2013.01); *G06K 19/0707* (2013.01); *G06K 19/0723* (2013.01)

(58) Field of Classification Search
None
See application file for complete search history.

(56) References Cited

U.S. PATENT DOCUMENTS 5,444,223 A * 8/1995 Blama ................ G06K 19/0672
                                                    235/487
6,362,738 B1 * 3/2002 Vega .................. G06K 7/10326
                                                    340/568.1
(Continued)

FOREIGN PATENT DOCUMENTS

CN    102884540 A     1/2013
CN    103593697      2/2014
(Continued)

OTHER PUBLICATIONS

International Search Report (ISR) dated Nov. 2, 2020 filed in PCT/JP2020/031705.
(Continued)

*Primary Examiner* — Fekadeselassie Girma
(74) *Attorney, Agent, or Firm* — RANKIN, HILL & CLARK LLP

(57) ABSTRACT

A tag indicating an attribute of the tag by an electromagnetic wave reflection characteristic, the tag including a substrate (11), and a conductor pattern layer (12) formed on the substrate (11) and having first and second slots (13*a*) and (13*b*) disposed adjacent to each other, in which the first slot (13*a*) constitutes a first resonance element (13Qa) having a resonance frequency at a first frequency, the second slot (13*b*) constitutes a second resonance element (13Qb) having a resonance frequency at a second frequency higher than the first frequency, and when irradiation with the electromagnetic waves is performed, a Q value of a resonance peak appearing at the first frequency is higher than a Q value of a resonance peak appearing at the first frequency when the first slot (13*a*) alone constitutes a resonance structure of the tag.

20 Claims, 19 Drawing Sheets

(56) References Cited

U.S. PATENT DOCUMENTS

| | | | | |
|---|---|---|---|---|
| 6,894,616 | B1* | 5/2005 | Forster | H10N 30/40 |
| | | | | 330/171 |
| 9,691,048 | B1* | 6/2017 | Gibson | G06K 19/0672 |
| 9,697,446 | B2* | 7/2017 | Perret | G06K 19/086 |
| 9,740,975 | B2* | 8/2017 | Gibson | G06K 19/0672 |
| 9,912,187 | B2* | 3/2018 | Sultenfuss | H02J 50/70 |
| 9,954,388 | B2* | 4/2018 | Sultenfuss | H02J 50/12 |
| 10,102,470 | B2* | 10/2018 | Coppola | H05K 3/103 |
| 10,670,543 | B2* | 6/2020 | Donohue | G01N 27/10 |
| 10,932,366 | B2* | 2/2021 | Akre | H05K 1/141 |
| 11,163,967 | B2* | 11/2021 | Ladan | G06K 7/143 |
| 2009/0017578 | A1* | 1/2009 | Walther | B41F 17/00 |
| | | | | 29/601 |
| 2009/0224883 | A1* | 9/2009 | Angell | G06K 7/0008 |
| | | | | 340/10.1 |
| 2010/0283698 | A1* | 11/2010 | Orihara | H01Q 7/00 |
| | | | | 343/788 |
| 2013/0015248 | A1* | 1/2013 | Perret | G06K 19/0672 |
| | | | | 235/492 |
| 2013/0300101 | A1* | 11/2013 | Wicker | B42D 25/00 |
| | | | | 283/67 |
| 2013/0321230 | A1* | 12/2013 | Merlin | H01Q 1/2225 |
| | | | | 343/893 |
| 2014/0209691 | A1* | 7/2014 | Finn | H01F 27/363 |
| | | | | 235/492 |
| 2015/0371129 | A1* | 12/2015 | Hoffa | B23K 26/38 |
| | | | | 340/10.2 |
| 2018/0068214 | A1* | 3/2018 | Jesme | G06K 19/0775 |

FOREIGN PATENT DOCUMENTS

| | | | |
|---|---|---|---|
| CN | 103593697 A | 2/2014 | |
| EP | 3244350 A1 * | 11/2017 | C08F 116/06 |
| EP | 3244712 A1 * | 11/2017 | G03F 7/06 |
| JP | 2001-134726 A | 5/2001 | |
| JP | 2009-529724 A | 8/2009 | |
| WO | 2015/061827 | 5/2015 | |
| WO | 2015/061827 A1 | 5/2015 | |
| WO | WO-2015061827 A1 * | 5/2015 | G06K 19/0672 |

OTHER PUBLICATIONS

Chinese Office Action (CNOA) dated Mar. 27, 2023 for CN202080058878.4; English translation.

Extended European Search Report (EESR) dated Sep. 5, 2022 filed in European patent application No. 20856016.9.

Japanese Office Action dated Jan. 16, 2024 issued in Japanese patent application No. 2021-542857 and its English machine translation.

* cited by examiner

TAG

TECHNICAL FIELD

The present disclosure relates to a tag.

BACKGROUND ART

In recent years, an RFID system using a tag called a "chipless RFID tag" has attracted attention as a technology replacing a barcode or an IC chip built-in electronic tag.

The chipless RFID tag does not have an integrated circuit in the tag, and identification information is constituted by reflection characteristics when the tag is irradiated with electromagnetic waves. Then, in this type of RFID system, a tag reader irradiates the chipless RFID tag with electromagnetic waves, and the tag reader detects the reflection characteristics of the chipless RFID tag, thereby reading the identification information attached to the chipless RFID tag.

As this type of a chipless RFID tag, for example, a chipless RFID tag is known in which a plurality of resonance elements having resonance frequencies different from each other is formed on a substrate of the tag, and identification information is expressed by a combination of the resonance elements (see, for example, Patent Literature 1).

On the other hand, this type of tag is also used as a chipless sensor tag that detects a state change of an object or an environment in a non-contact manner (see, for example, Patent Literature 2). The chipless sensor tag has, for example, a resonance element physically associated with a state of a detection target, and is configured to detect a state change of the detection target from a change in a resonance frequency of the resonance element. Then, the state change of the detection target detected by the chipless sensor tag is read by the tag reader as a change in a reflected wave spectrum of the chipless sensor tag with respect to the electromagnetic waves emitted from the tag reader.

CITATION LIST

Patent Literature

Patent Literature 1: JP 2009-529724 A
Patent Literature 2: JP 2001-134726 A

SUMMARY OF INVENTION

Technical Problem

Incidentally, from the electromagnetic wave reflection characteristics of the tag as described above, a system that reads an attribute of the tag (meaning identification information of the chipless RFID tag or a state of a detection target detected by the chipless sensor tag. Hereinafter, the same applies) has a problem that an SN ratio of a signal of reflected waves at a resonance peak (that is, a resonance peak appearing at a resonance frequency of the resonance element configured in the tag) is poor when the tag reader irradiates the tag with the electromagnetic waves. Accordingly, in the tag reader, a problem has occurred that the identification information attached to the tag and a state change of the detection target to be detected by the tag cannot be read with high accuracy.

The present disclosure has been made in view of the above problems, and an object of the present disclosure is to provide a tag capable of improving an SN ratio of a signal of reflected waves at a resonance peak.

Solution to Problem

A main aspect of the present disclosure for solving the above-described problems is a tag indicating an attribute of the tag by an electromagnetic wave reflection characteristic, the tag including:
a substrate; and
a conductor pattern layer formed on the substrate and having first and second slots disposed adjacent to each other,
in which the first slot constitutes a first resonance element having a resonance frequency at a first frequency,
the second slot constitutes a second resonance element having a resonance frequency at a second frequency higher than the first frequency, and
when irradiation with the electromagnetic waves is performed, a Q value of a resonance peak appearing at the first frequency is higher than a Q value of a resonance peak appearing at the first frequency when the first slot alone constitutes a resonance structure of the tag.

Another aspect is a tag indicating an attribute of the tag by an electromagnetic wave reflection characteristic, the tag including:
a substrate; and
a conductor pattern layer formed on the substrate and having n (n is a positive integer of 3 or more) slots,
in which the n slots
constitute n resonance elements having resonance frequencies different from each other, and are disposed adjacent to each other in such a manner that resonance lengths of the resonance elements are sequentially shortened, and
when irradiation with the electromagnetic waves is performed, a Q value of a resonance peak appearing at a resonance frequency of a kth (k is an integer of 1 to n−1) resonance element counted from a resonance element with a longer length of the slot among the n resonance elements is higher than a Q value of a resonance peak appearing when a resonance structure of the tag is configured by the kth resonance element alone.

Advantageous Effects of Invention

With a tag of the present disclosure, the SN ratio of a signal of a reflected wave at a resonance peak can be improved.

DESCRIPTION OF EMBODIMENTS

Figure 1:
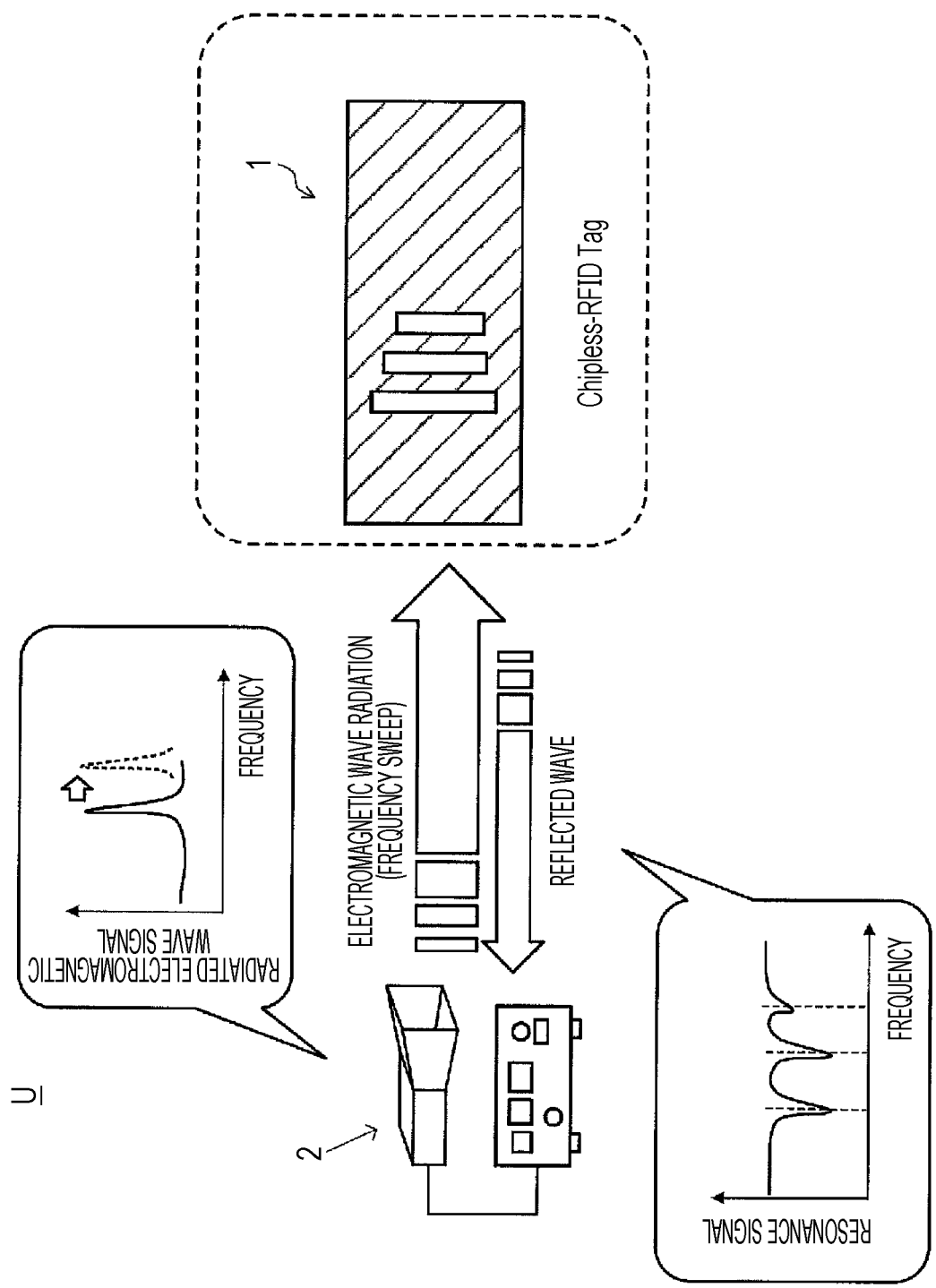
FIG. 1 is an example of a configuration of an RFID system according to a first embodiment.

Hereinafter, preferred embodiments of the present disclosure will be described in detail with reference to the accompanying drawings. Note that, in the present description and the drawings, components having substantially the same function are denoted by the same reference numerals, and redundant description is omitted.

[Configuration of RFID System]

First, an overall configuration of an RFID system U according to an embodiment will be described with reference to FIGS. 1 and 2.

FIG. 1 is a diagram illustrating an example of a configuration of an RFID system U according to the present embodiment.

The RFID system U according to the present embodiment includes a chipless RFID tag 1 and a tag reader 2.

The chipless RFID tag 1 (hereinafter, it is abbreviated as "tag 1") constitutes identification information by reflection characteristics with respect to electromagnetic waves irradiated from the outside (here, the tag reader 2).

Figure 4:
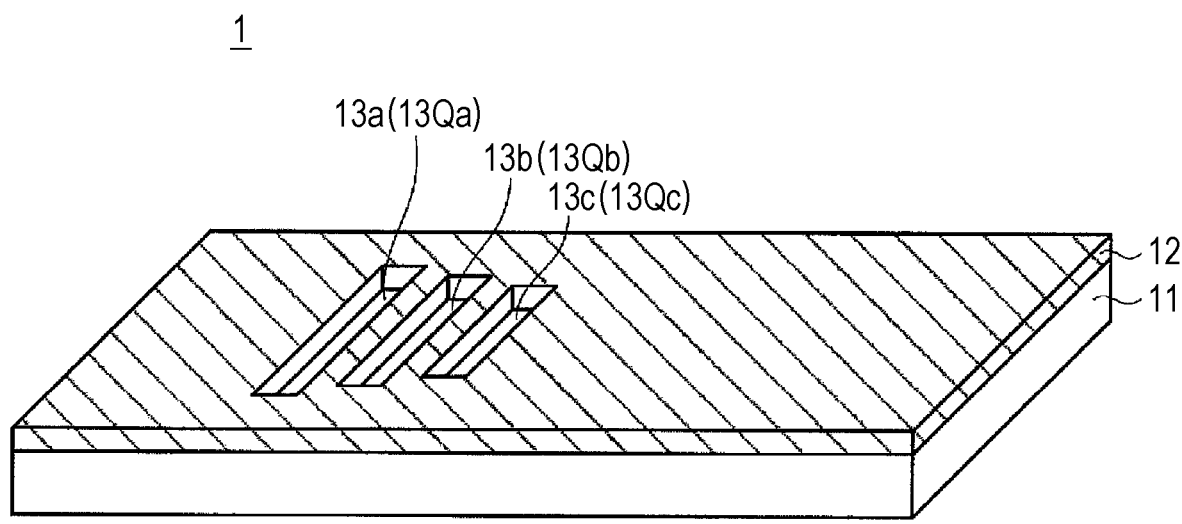
FIG. 4 is a perspective view of the tag according to the first embodiment.

Specifically, the tag 1 has a plurality of resonance elements that resonate when irradiated with electromagnetic waves of a predetermined frequency (described later with reference to FIG. 4). Then, the tag 1 has a reflection characteristic of absorbing electromagnetic waves of a frequency matching the resonance frequency of each of the plurality of resonance elements and reflecting electromagnetic waves when irradiated with electromagnetic waves of a frequency other than the resonance frequency. That is, the tag 1 configures identification information by using power loss (absorption) due to resonance as a signal.

The identification information configured by the tag 1 is associated with the resonance frequency of each of the plurality of resonance elements formed in the tag 1, and is represented as, for example, "0010100" or the like, with an identification code of the digit number corresponding to the resonance frequency as "1".

Note that the resonance element of the tag 1 is formed to have a resonance frequency in a millihertz or gigahertz frequency band (1 GHz to 3 THz), for example.

The tag reader 2 transmits high-frequency (for example, a band of 1 GHz to 10 GHz) electromagnetic waves and irradiates the tag 1 with the electromagnetic waves. At this time, the tag reader 2 transmits electromagnetic waves so as to sweep a transmission frequency within a predetermined frequency band, and detects a resonance frequency of the tag 1 on the basis of a reflection characteristic of reflected waves from the tag 1 when the electromagnetic waves are transmitted.

Figure 2:
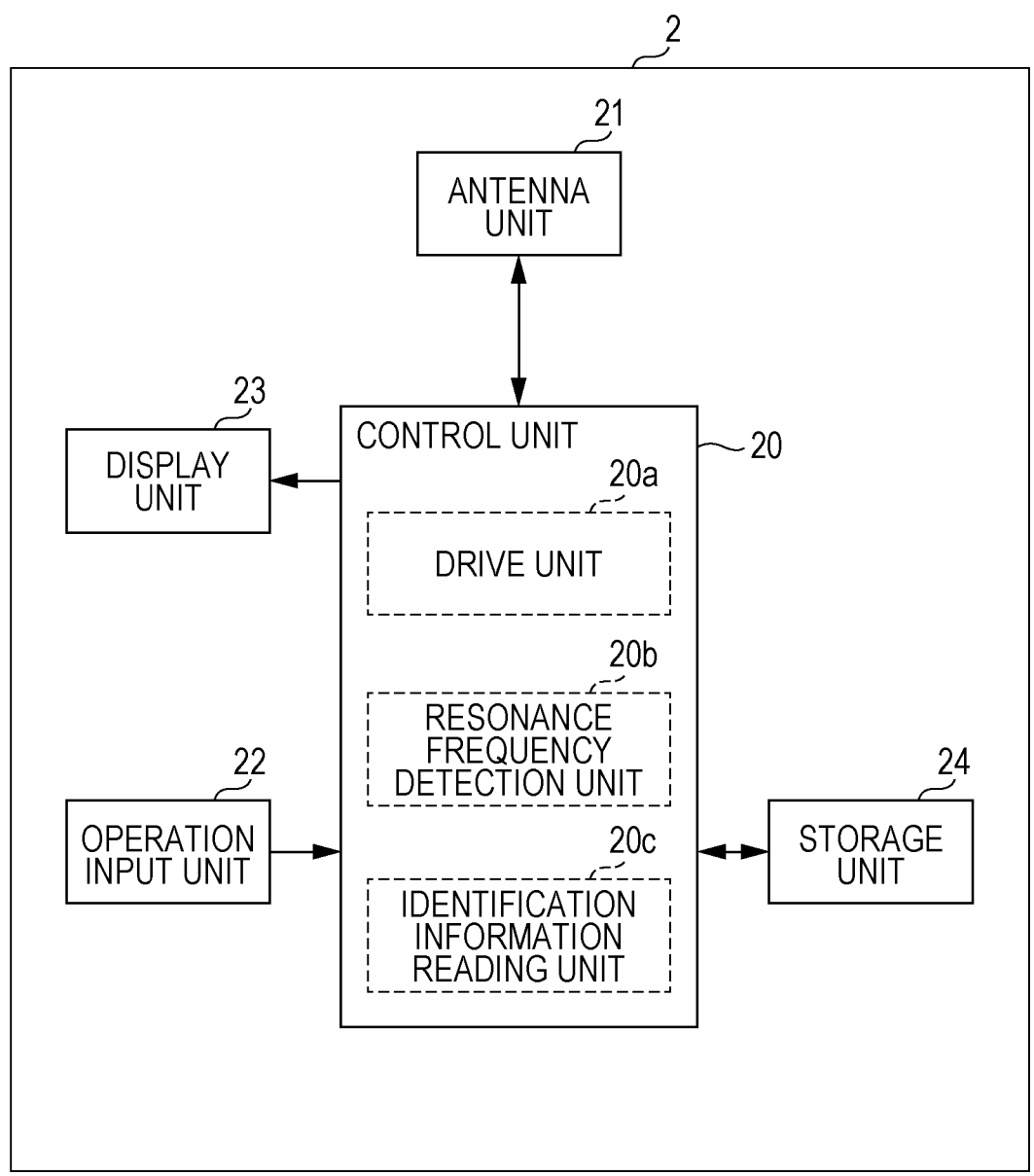
FIG. 2 is a diagram illustrating an example of a configuration of a tag reader according to the first embodiment.

FIG. 2 is a diagram illustrating an example of a configuration of the tag reader 2 according to the present embodiment.

The tag reader 2 includes an antenna unit 21, an operation input unit 22, a display unit 23, a storage unit 24, and a control unit 20.

The antenna unit 21 is, for example, a dipole antenna, a patch antenna, a horn antenna, or the like, and transmits electromagnetic waves of a predetermined frequency on the basis of a drive signal from the control unit 20 (drive unit 20$a$). Further, the antenna unit 21 receives a reflected wave from the tag 1 when the electromagnetic waves are transmitted, and outputs reflected waves to the control unit 20 (resonance frequency detection unit 20$b$).

The operation input unit 22 includes various switches such as an irradiation switch for transmitting electromagnetic waves, receives various input operations by the user, and outputs an operation signal to the control unit 20.

The display unit 23 includes, for example, a liquid crystal display. The display unit 23 displays various operation screens and identification information configured in the tag 1 in accordance with a display control signal input from the control unit 20.

The storage unit 24 includes a non-volatile semiconductor memory or a hard disk drive, and stores a control program and various data.

The control unit 20 is a controller that integrally controls the tag reader 2, and includes a drive unit 20$a$, a resonance frequency detection unit 20$b$, and an identification information reading unit 20$c$.

The drive unit 20$a$ generates a drive signal (for example, a sinusoidal signal) corresponding to the electromagnetic waves to be transmitted from the antenna unit 21, and supplies the drive signal to the antenna unit 21. Note that the drive unit 20$a$ includes, for example, a variable frequency generator, an amplifier, a frequency setting unit, and the like.

For example, the drive unit 20$a$ causes the antenna unit 21 to transmit electromagnetic waves having peak intensity at a single frequency. Then, the drive unit 20a temporally changes the transmission frequency of the electromagnetic waves to be transmitted from the antenna unit 21, and performs a frequency sweep within a preset predetermined frequency band. Thus, the resonance frequency of the tag 1 is searched for. Then, the resonance frequency of the tag 1 is detected as a change in the reflection characteristic of the reflected wave from the tag 1 when the resonance frequency coincides with the transmission frequency of the electromagnetic waves transmitted by the antenna unit 21.

Note that the drive unit 20a may temporarily and collectively emit electromagnetic waves having a specific intensity profile in a predetermined frequency band (that is, an impulse method).

The resonance frequency detection unit 20b detects the resonance frequency of the tag 1 on the basis of the reflection characteristic of the reflected waves from the tag 1 when the electromagnetic waves are transmitted from the antenna unit 21. Note that the resonance frequency detection unit 20b is configured to include, for example, a network analyzer, and detects a reflection characteristic by an S parameter (for example, S21) obtained from power or the like of reflected waves received by the antenna unit 21.

The identification information reading unit 20c refers to, for example, a data table associating a resonance frequency stored in advance in a storage unit (not illustrated) with identification information, and identifies the identification information of the tag 1 on the basis of the resonance frequency of the tag 1 detected by the resonance frequency detection unit 20b.

[Detailed Configuration of Tag]

Figure 3:
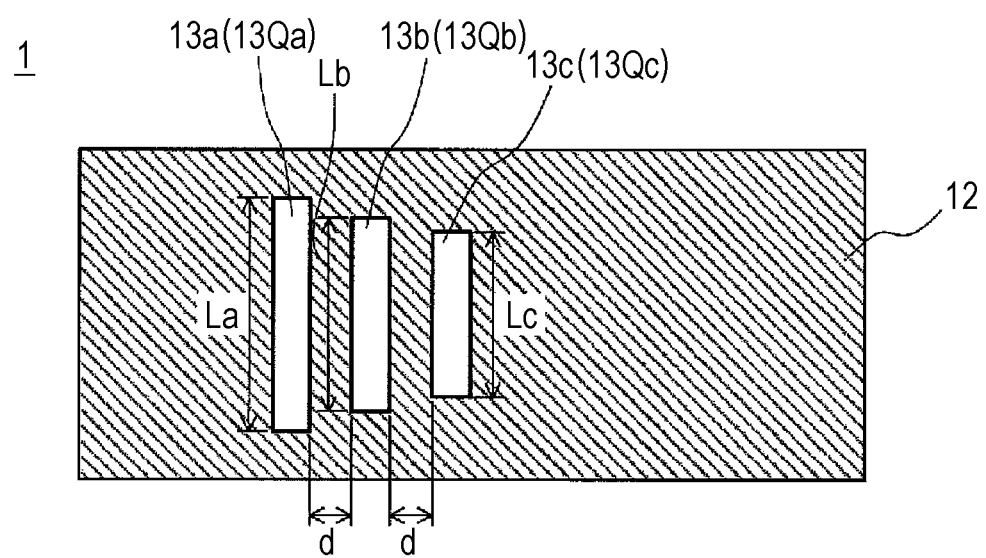
FIG. 3 is a plan view of a tag according to the first embodiment.

FIG. 3 is a plan view of the tag 1 according to the present embodiment. FIG. 4 is a perspective view of the tag 1 according to the present embodiment.

Figure 5:
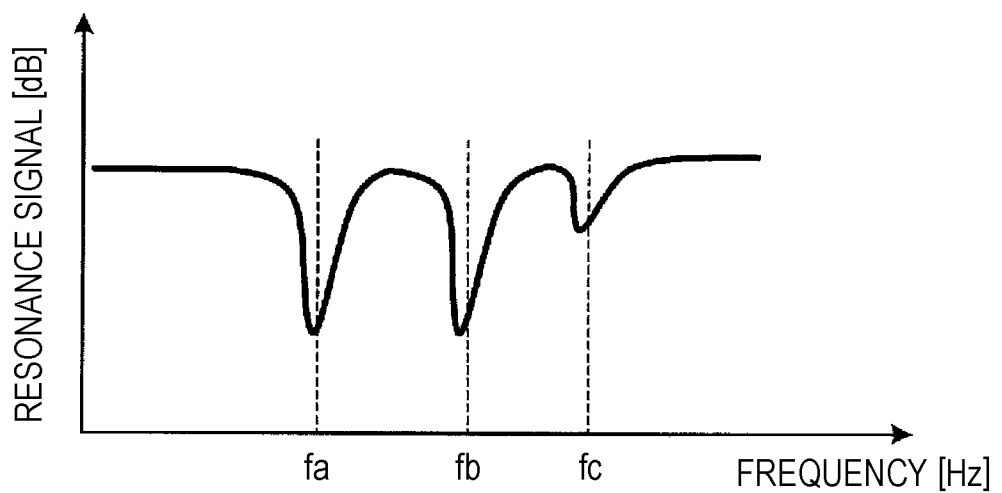
FIG. 5 is a diagram illustrating a reflection characteristic of the tag according to the first embodiment.

FIG. 5 is a diagram illustrating a reflection characteristic of the tag 1 according to the present embodiment. The reflection characteristic in FIG. 5 indicates a behavior of reflected waves emitted from the tag 1 when the tag 1 is irradiated with the electromagnetic waves while being subjected to the frequency sweep. In FIG. 5, the horizontal axis represents the frequency [Hz] of the electromagnetic waves to be irradiated, and the vertical axis represents the resonance signal [dB] (that is, intensity of the reflected waves emitted when the electromagnetic waves are irradiated).

The tag 1 includes a substrate 11 and a conductor pattern layer 12 disposed on the substrate 11.

The substrate 11 is a dielectric material such as a paper material or a resin material.

From a practical point of view, it is desirable to use a printed matter in which a print coating layer is formed on a front surface side as the substrate 11. In this case, the conductor pattern layer 12 is desirably formed on a surface opposite to the printing surface of the printed matter.

The conductor pattern layer 12 is formed of a conductive material such as an aluminum material or a copper material. The conductor pattern layer 12 is, for example, a coating layer formed by a printing method or a metal foil layer formed by a foil transfer method. More preferably, the conductor pattern layer 12 is formed by an on-demand foil stamping method (meaning a foil transfer method not using a transfer mold).

The conductor pattern layer 12 has a plurality (here, three) of slots 13a, 13b, and 13c formed so as to partially cut out the solid conductor layer. The plurality of slots 13a, 13b, and 13c constitutes a plurality (here, three) of resonance elements 13Qa, 13Qb, and 13Qc having resonance frequencies different from each other, respectively. The resonance elements 13Qa, 13Qb, and 13Qc formed by the slots 13a, 13b, and 13c are resonance elements called slot antennas.

Specifically, the conductor pattern layer 12 includes a first slot 13a, a second slot 13b, and a third slot 13c disposed adjacent to each other. Then, the first slot 13a constitutes the first resonance element 13Qa having a resonance frequency at a first frequency fa, the second slot 13b constitutes the second resonance element 13Qb having a resonance frequency at a second frequency fb (where fb>fa), and the third slot 13c constitutes the third resonance element 13Qc having a resonance frequency at a third frequency fc (where fc>fa).

The resonance peaks at the frequencies fa, fb, and fc in FIG. 5 represent power loss (absorption) due to resonances of the first to third resonance elements 13Qa, 13Qb, and 13Qc formed in the tag 1. Hereinafter, the frequencies fa, fb, and fc are also referred to as resonance frequencies fa, fb, and fc.

The first slot 13a has a rectangular shape having a length of about $\lambda/2$ of the wavelength corresponding to the first frequency fa, the second slot 13b has a rectangular shape having a length of about $\lambda/2$ of the wavelength corresponding to the second frequency fb, and the third slot 13c has a rectangular shape having a length of about $\lambda/2$ of the wavelength corresponding to the third frequency fc.

The first slot 13a, the second slot 13b, and the third slot 13c are disposed substantially parallel to each other so as to face each other in a longitudinal direction. Further, the first slot 13a, the second slot 13b, and the third slot 13c are disposed such that the slot length (represents a length in the longitudinal direction. The same applies below) decreases in order from one side to the other side. In addition, the first slot 13a, the second slot 13b, and the third slot 13c are disposed such that the center positions in the longitudinal direction are aligned. Note that the lengths in the longitudinal direction of the slots 13a, 13b, and 13c are hereinafter also referred to as "resonance lengths".

[Sacrificial Effect]

Hereinafter, a design concept of the tag 1 according to the present embodiment will be described in detail with reference to FIGS. 6 to 10.

As a result of intensive studies, the inventors of the present application have found that by disposing another slot (hereinafter, referred to as a "sacrificial slot") having a shorter length than one slot (hereinafter, referred to as a "signal slot") is disposed adjacent to the signal slot, a phenomenon (hereinafter, referred to as a "sacrificial effect") in which a Q value of a resonance peak at a resonance frequency of a resonance element configured by the signal slot increases occurs.

That is, in the tag 1 according to the present embodiment, when the tag 1 is irradiated with the electromagnetic wave, a Q value of a resonance peak appearing at the first frequency fa is higher than a Q value of a resonance peak appearing at the first frequency fa when the resonance structure of the tag 1 is configured by the first slot 13a alone. Further, when the tag 1 is irradiated with the electromagnetic wave, a Q value of a resonance peak appearing at the second frequency fb is higher than a Q value of a resonance peak appearing at the second frequency fb when the resonance structure of the tag 1 is configured by the second slot 13b alone (see FIG. 5).

However, such a phenomenon occurs only when a sacrificial slot (that is, a resonance element having a high resonance frequency) having a shorter length than the signal slot is disposed adjacent to the signal slot. Therefore, when the tag 1 is irradiated with the electromagnetic wave, a Q value of a resonance peak appearing at the third frequency fc does not increase from a Q value of a resonance peak appearing at the third frequency fc when the resonance structure of the tag 1 is configured by the second slot 13*b* alone (see FIG. 5).

Note that the Q value is a value represented by Q=ω0/(ω2−ω1) when a frequency at the resonance peak is ω0, a frequency at which vibration energy becomes a half value of the resonance peak on a lower frequency side than the resonance peak is ω1, and a frequency at which vibration energy becomes a half value of the resonance peak on a higher frequency side than the resonance peak is ω2.

Figure 6A:
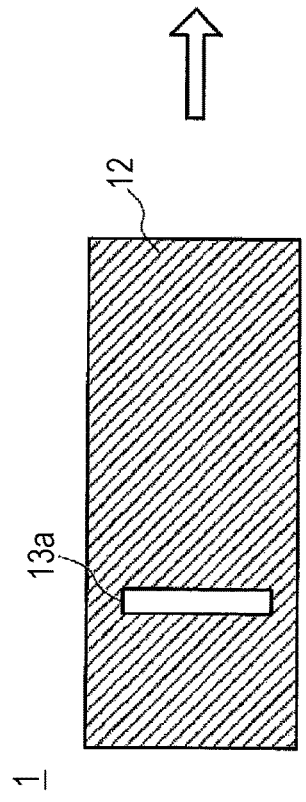
FIGS. 6A, 6B, and 6C are diagrams for explaining a sacrificial effect in the tag according to the first embodiment.
Figure 6B:
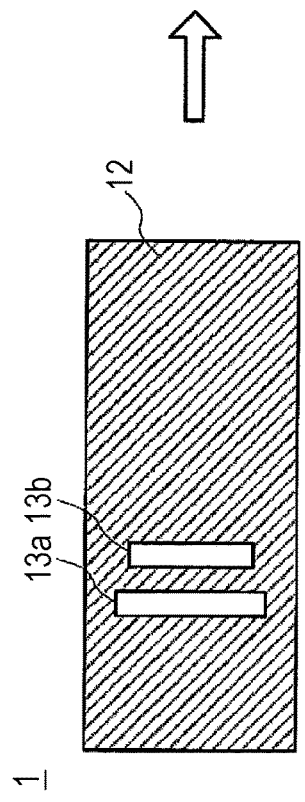
Figure 6C:
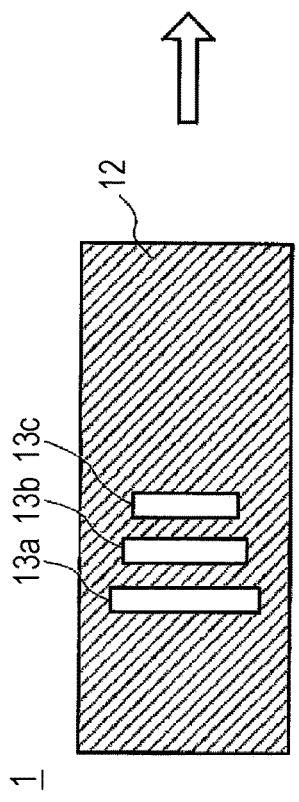

FIG. 6 is a diagram illustrating a sacrificial effect in the tag 1 according to the present embodiment. FIG. 6A is a diagram schematically illustrating a reflection characteristic in a case where the conductor pattern layer 12 includes only the first slot 13*a*. FIG. 6B is a diagram schematically illustrating a reflection characteristic in a case where the conductor pattern layer 12 includes only the first slot 13*a* and the second slot 13*b*. FIG. 6C is a diagram schematically illustrating a reflection characteristic in a case where the conductor pattern layer 12 includes the first slot 13*a*, the second slot 13*b*, and the third slot 13*c*.

The behaviors in FIGS. 6A, 6B, and 6C are calculated by electromagnetic field analysis simulation. The horizontal axis of the reflection characteristic illustrated in FIGS. 6A, 6B, and 6C represents the frequency [Hz], and the vertical axis represents the resonance signal [dB] (here, the amount of absorption at the time of irradiation with electromagnetic waves).

First, when the conductor pattern layer 12 has only the first slot 13*a*, a resonance peak is detected only at first frequency fa (FIG. 6A).

When the conductor pattern layer 12 has the first slot 13*a* and the second slot 13*b*, resonance peaks are detected at the first frequency fa and the second frequency fb (FIG. 6B). At this time, due to the sacrificial effect of the second slot 13*b*, the Q value of the resonance peak at the first frequency fa is larger than that in the case where the resonance structure is configured by the first slot 13*a* alone (FIG. 6A).

When the conductor pattern layer 12 has the first slot 13*a*, the second slot 13*b*, and the third slot 13*c*, resonance peaks are detected at the first frequency fa, the second frequency fb, and the third frequency fc (FIG. 6C). At this time, due to the sacrificial effect of the second slot 13*b*, the Q value of the resonance peak at the first frequency fa increases more than in the mode of FIG. 6A. In addition, due to the sacrificial effect of the third slot 13*c*, the Q value of the resonance peak at the second frequency fb increases more than in the mode of FIG. 6B. In other words, the Q value of the resonance peak at the first frequency fa and the Q value of the resonance peak at the second frequency fb increase more than the Q value of the resonance peak appearing at the first frequency fa when the resonance structure of the tag 1 is configured by the first slot 13*a* alone and the Q value of the resonance peak appearing at the second frequency fb when the resonance structure of the tag 1 is configured by the second slot 13*b* alone, respectively.

Figure 7:
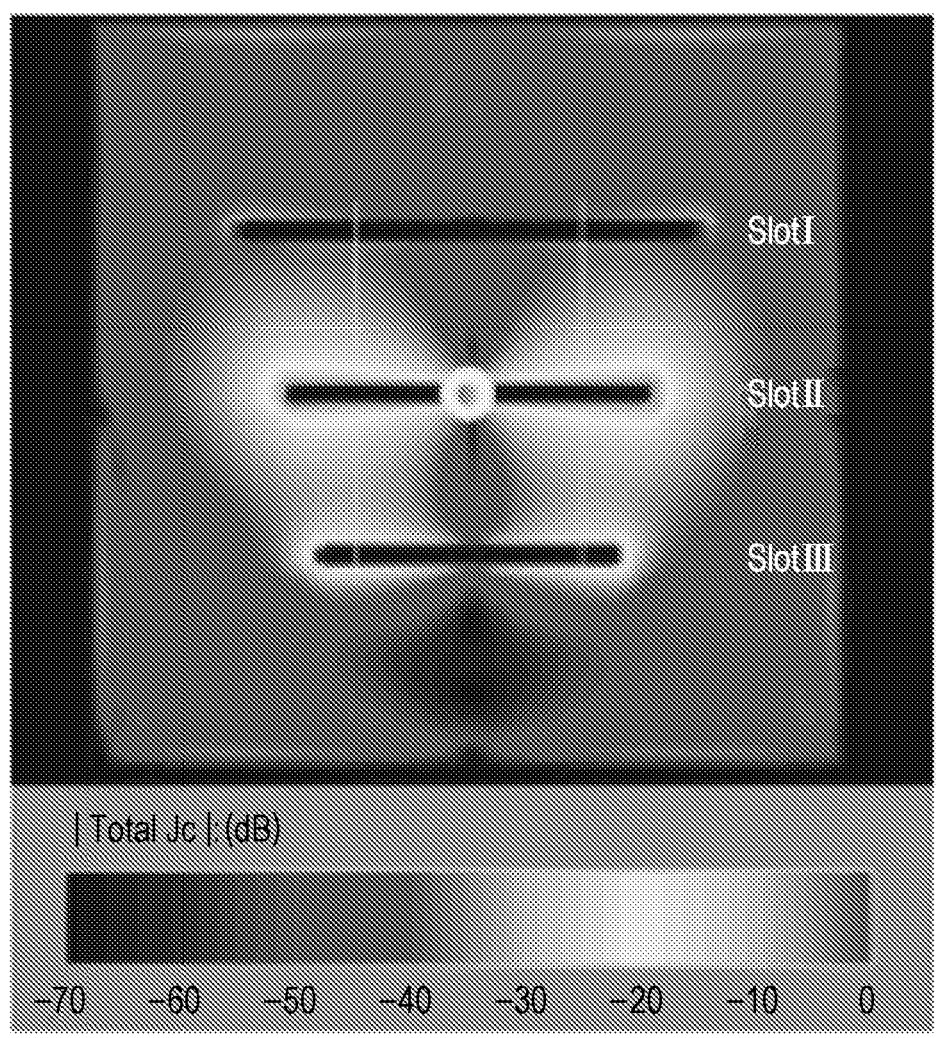
FIG. 7 is a diagram illustrating a current distribution (intensity distribution) detected when the tag according to the first embodiment is irradiated with electromagnetic waves.

FIG. 7 is a diagram illustrating a current distribution (intensity distribution) detected when the tag 1 according to the present embodiment is irradiated with the electromagnetic waves having the second frequency fb (that is, the resonance frequency of the second resonance element 13Qb). The current distribution in FIG. 7 is calculated by electromagnetic field analysis simulation. In FIG. 7, "Slot I" represents the first slot 13*a*, "Slot II" represents the second slot 13*b*, and "Slot III" represents the third slot 13*c*.

As can be seen from FIG. 7, when the tag 1 is irradiated with the electromagnetic waves of the second frequency fb, the second resonance element 13Qb formed by the second slot 13*b* resonates, so that the resonance current flows around the second slot 13*b*. At this time, it can be seen that no current is induced around the first slot 13*a*, while a current is induced around the third slot 13*c*.

That is, it can be seen that the resonance current induced in the entire tag 1 increases by disposing the third slot 13*c* having a slightly shorter length than the second slot 13*b* adjacent to the second slot 13*b*. Consequently, it is presumed that a sacrificial effect as illustrated in FIG. 6 is exhibited.

Figure 8:
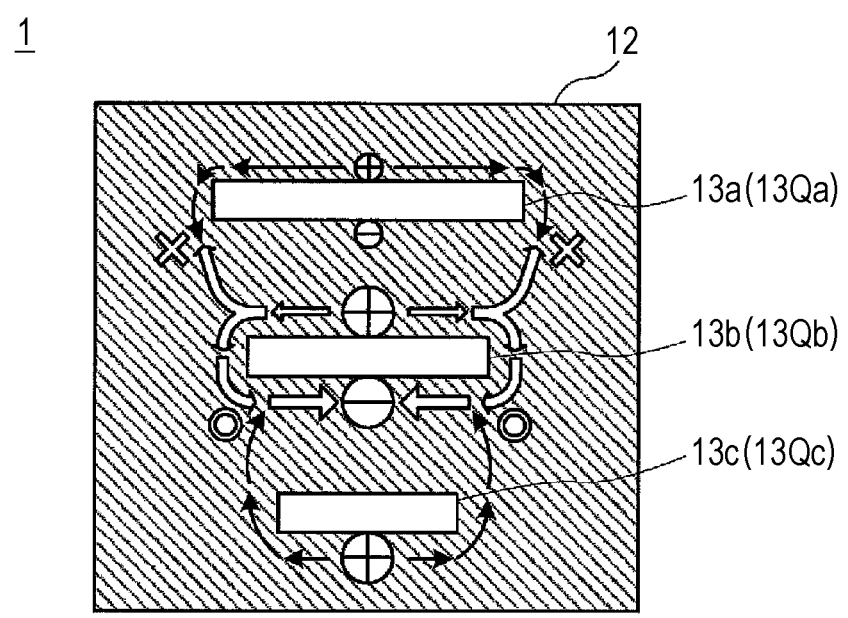
FIG. 8 is a diagram schematically illustrating a current path estimated from the current distribution of FIG. 7.

FIG. 8 is a diagram schematically illustrating a current path estimated from the current distribution of FIG. 7. The cause of the sacrificial effect is not clear, but is estimated as follows from the current distribution in FIG. 7.

When the second resonance element 13Qb resonates, at a certain time, the conductor pattern layer 12 is polarized with both sides in the longitudinal direction of the second slot 13*b* interposed therebetween, and a resonance current flows so as to surround the periphery of the second slot 13*b*.

Here, focusing on the first slot 13*a*, since the second frequency fb is a frequency equal to or higher than a cutoff frequency (a threshold of energy that can resonate with the first resonance element 13Qa) for the first slot 13*a*, the first slot 13*a* can resonate slightly. Therefore, when the electromagnetic waves of the second frequency fb are irradiated, weak polarization in the same direction as the second slot 13*b* is induced in the conductor pattern layer 12 across both sides in the longitudinal direction of the first slot 13*a*, and a current flows through the conductor pattern layer 12. At this time, since the current flows in the opposite direction between the first slot 13*a* and the second slot 13*b*, the currents cancel each other, and an electrical synergistic effect does not occur.

On the other hand, for the third slot 13*c*, since the resonance frequency fb of the second resonance element 13Qb is equal to or lower than the cutoff frequency, the third slot 13*c* does not resonate and spontaneous polarization does not occur. Therefore, the periphery of the third slot 13*c* is charged with a potential that reflects the potential applied to the second slot 13*b*. Then, a current flows in the conductor pattern layer 12 around the third slot 13*c* according to the potential thus formed. The current flowing at this time is in the same direction as the resonance current flowing so as to surround the periphery of the second slot 13*b*, and as a result, the current flowing between the second slot 13*b* and the third slot 13*c* increases.

As described above, by disposing the sacrificial slot (here, the third slot 13*c*) having a slightly shorter length than the signal slot close to the signal slot (here, the second slot 13*b*), it is presumed that the resonance current flowing around the signal slot increases and the above-described sacrificial effect is exhibited.

Next, details of the design of the tag 1 according to the present embodiment will be described.

As described above, a sacrificial slot having a shorter length than the signal slot is disposed close to the signal slot, and thereby a sacrificial effect is exerted. However, in order to effectively exhibit the sacrificial effect, the length ratio between the signal slot and the sacrificial slot and the distance between the signal slot and the sacrificial slot greatly affect. Therefore, the conductor pattern layer 12 of the tag 1 needs to be formed such that these two points satisfy the conditions described later.

Figure 9:
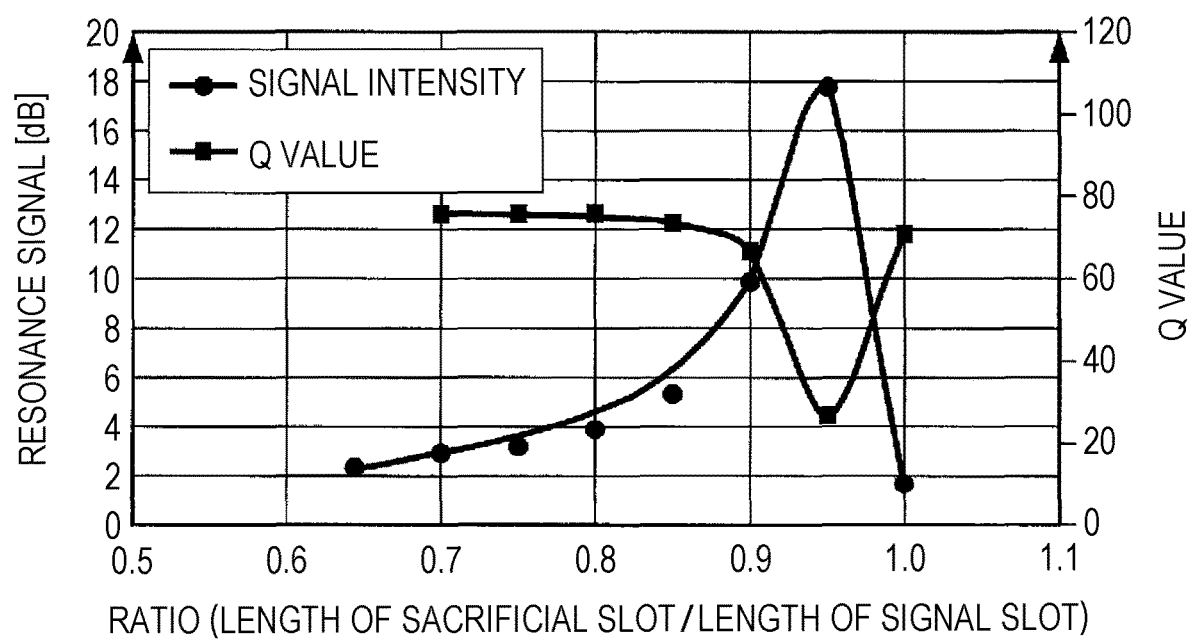
FIG. 9 is a diagram illustrating a simulation result of verifying a length ratio between a signal slot and a sacrificial slot and reflection characteristics that change due to the sacrificial effect.

FIG. 9 is a diagram illustrating simulation results verified for the length ratio between the signal slot and the sacrificial slot and the reflection characteristics that change due to the sacrificial effect. The signal intensity [dB] and the Q value of the resonance peak in FIG. 9 are the signal intensity [dB] and the Q value of the resonance peak at the resonance frequency of the resonance element configured by the signal slot.

In this simulation, the signal intensity [dB] and the Q value of the resonance peak in a case where the ratio of the length of the sacrificial slot to the length of the signal slot is changed have been verified by electromagnetic field analysis simulation.

In this simulation, the Q value of the resonance peak in a case where the resonance structure of the tag 1 is configured only with the signal slot was 13. With this Q value as a reference, results of changing the ratio μ length of sacrificial slot/length of signal slot) are as follows.

Ratio μ=1.00⇒Q value=9 (0.7 times) (evaluation: X)
Ratio μ=0.95⇒Q value=105 (8.1 times) (evaluation: ⊚)
Ratio μ=0.90⇒Q value=60 (4.6 times) (evaluation: ⊙)
Ratio μ=0.85⇒Q value=32 (2.5 times) (evaluation: ○)
Ratio μ=0.80⇒Q value=24 (1.8 times) (evaluation: ○)
Ratio μ=0.75⇒Q value=20 (1.5 times) (evaluation: ○)
Ratio μ=0.70⇒Q value=18 (1.4 times) (evaluation: Δ)
Ratio μ=0.65⇒Q value=10 (1.1 times) (evaluation: X)

From this result, it can be seen that when the signal slot and the sacrificial slot have the same length, the Q value of the resonance peak decreases more than in a case where the resonance structure of the tag 1 is configured by the signal slot alone. Further, when the ratio μ of the length of the sacrificial slot to the length of the signal slot is 0.9 or more and less than 0.98, the Q value of the resonance peak remarkably increases. Then, it can be seen that the Q value of the resonance peak decreases as the ratio μ becomes smaller than 0.9, and when the ratio μ becomes smaller than 0.65, the Q value of the resonance peak does not substantially increase, and the sacrificial effect is no longer exhibited.

Therefore, in order to effectively exhibit the sacrificial effect, the ratio of the length of the sacrificial slot to the length of the signal slot needs to be 0.70 or more and less than 1.0. In particular, from the viewpoint of significantly increasing the Q value, the ratio of the length of the sacrificial slot to the length of the signal slot is desirably 0.9 or more and less than 0.98.

In addition, the distance between the signal slot and the sacrificial slot is important in order to effectively exhibit the sacrificial effect. According to the verification result of the electromagnetic field analysis simulation, it has been found that when the distance d between the adjacent slots is not λ/10 or less in the used frequency band, the sacrificial effect is not effectively exhibited (that is, the Q value of the resonance peak does not increase). Note that detailed simulation results are omitted here.

From such a viewpoint, in the tag 1 according to the present embodiment, the ratio (Lb/La) of the length Lb of the second slot 13b to the length La of the first slot 13a is set to, for example, 0.9, and the ratio (Lc/Lb) of the length Lc of the third slot 13c to the length Lb of the second slot 13b is set to 0.9.

Further, in the tag 1 according to the present embodiment, the distance d between the first slot 13a and the second slot 13b is set to λ/20 (for example, 1 mm), and the distance d between the second slot 13b and the third slot 13c is set to λ/20 (for example, 1 mm).

Note that, in order to more effectively exhibit the sacrificial effect, an alignment state between the signal slot and the sacrificial slot is also important. From such a viewpoint, in the tag 1 according to the present embodiment, the first slot 13a, the second slot 13b, and the third slot 13c are disposed substantially parallel to each other such that the longitudinal directions face each other, and are disposed such that center positions in the longitudinal direction are aligned.

The identification information of the tag 1 is expressed by the resonance frequency of each of the plurality of resonance elements configured on the tag 1. However, in the tag 1 according to the present embodiment, the identification information is not configured for the maximum resonance frequency among the resonance frequencies of the plurality of resonance elements configured in the tag 1. Specifically, only the resonance frequency fa of first resonance element 13Qa and the resonance frequency fb of second resonance element 13Qb constitute the identification information, and the resonance frequency fc of third resonance element 13Qc does not constitute the identification information. This is because the third resonance element 13Qc is disposed to exhibit the sacrificial effect, and the Q value of the resonance peak at the resonance frequency fc of the third resonance element 13Qc is smaller than the Q values of the resonance peaks at the resonance frequencies fa and fb of the other resonance elements 13Qa and 13Qb.

Therefore, the tag reader 2 (identification information reading unit 20c) identifies the identification information of the tag 1 on the basis of resonance frequencies (here, fa, fb, and fc) other than the maximum resonance frequency among resonance frequencies (here, fa and fb) of the plurality of resonance elements configured in the tag 1.

The maximum resonance frequency (here, fc) among the resonance frequencies of the plurality of resonance elements formed in the tag 1 may be used as a frequency that plays an auxiliary role in identifying the other resonance frequencies fa and fb.

Modification Example

FIGS. 10 and 11 illustrate modification examples of the tag 1.

Figure 10A:
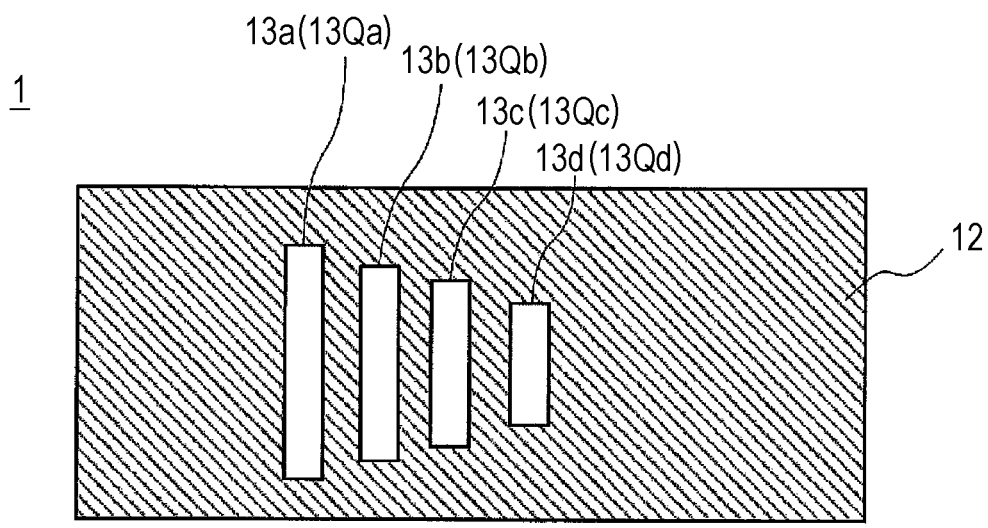
FIG. 10 is a diagram illustrating a configuration (FIG. 10A) of a modification example of the tag according to the first embodiment and a reflection characteristic (FIG. 10B) of the tag.
Figure 10B:
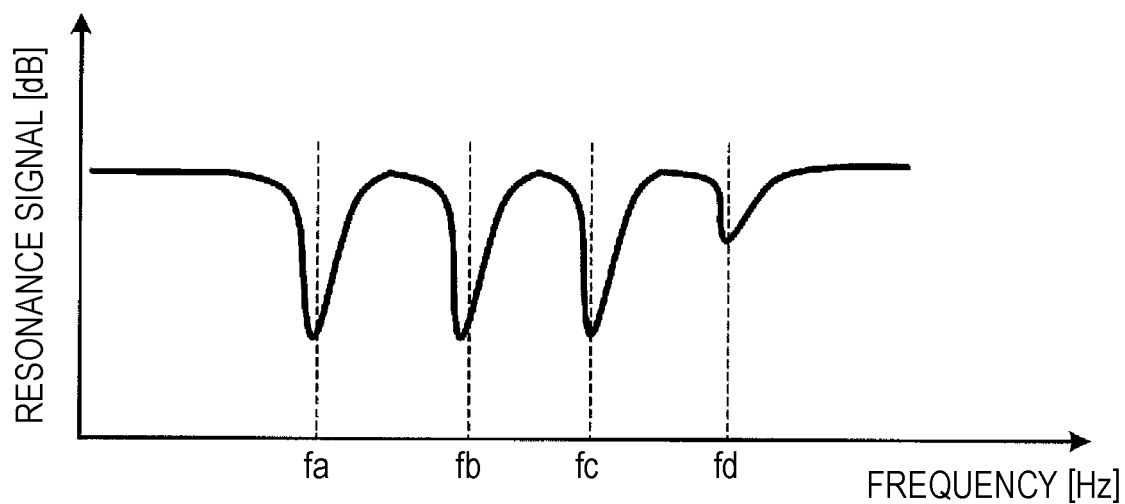

FIG. 10 is a diagram illustrating a configuration of the tag 1 (FIG. 10A) and a reflection characteristic of the tag 1 (FIG. 10B) in a case where a fourth slot 13d having a shorter length than the third slot 13c is added adjacent to the third slot 13c in the configuration of the tag 1 of FIG. 3.

Figure 11A:
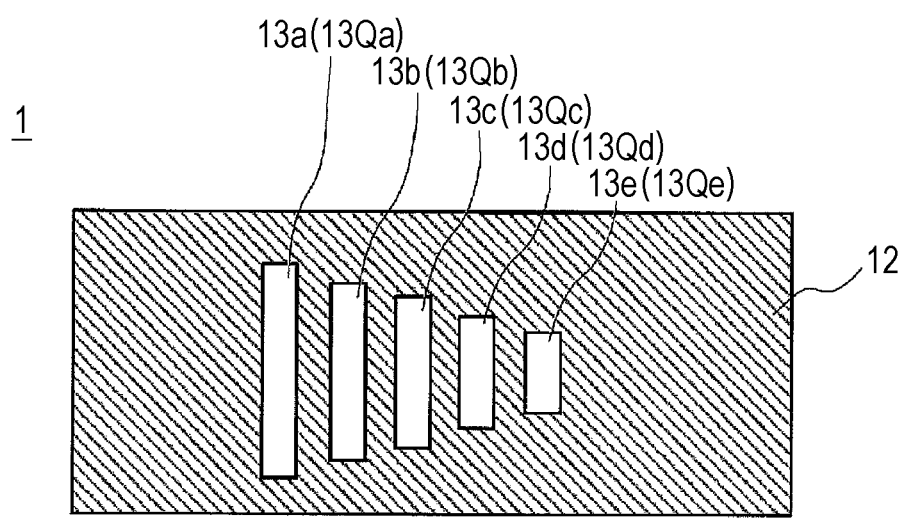
FIG. 11 is a diagram illustrating a configuration (FIG. 11A) of a modification example of the tag according to the first embodiment and a reflection characteristic (FIG. 11B) of the tag.
Figure 11B:
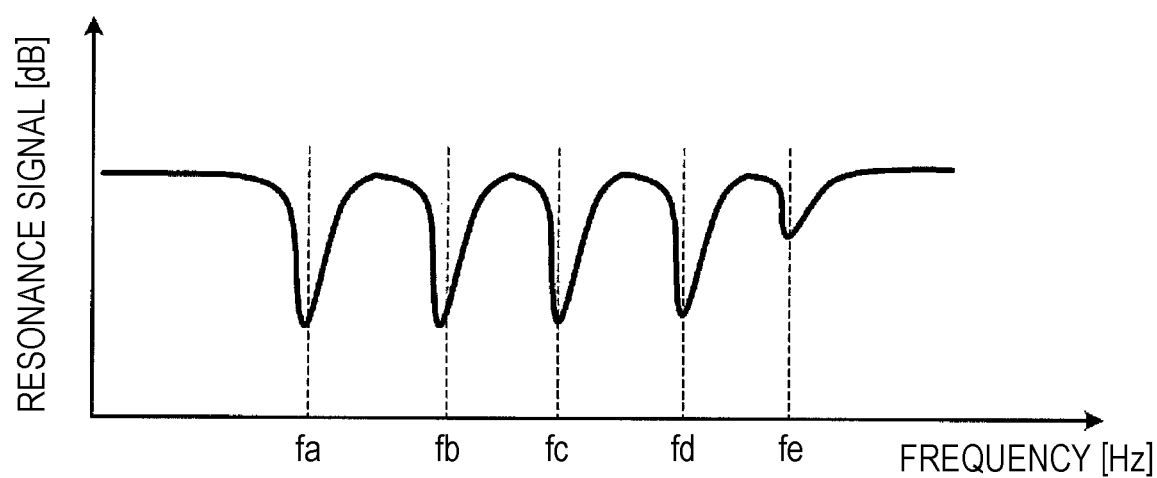

FIG. 11 is a diagram illustrating a configuration of the tag 1 (FIG. 11A) and a reflection characteristic of the tag 1 (FIG. 11B) in a case where a fifth slot 13e having a shorter length than the fourth slot 13d is added adjacent to the fourth slot 13d in the configuration of the tag 1 of FIG. 10.

As can be seen from the reflection characteristics of FIG. 10, when the fourth slot 13d is disposed, the Q value of the resonance peak at the resonance frequency fc of the third resonance element 13Qc configured by the third slot 13c increases due to the sacrificial effect of the fourth slot 13d. In this case, the resonance frequency fa of the first resonance element 13Qa, the resonance frequency fb of the second resonance element 13Qb, and the resonance frequency fc of the third resonance element 13Qc constitute the identification information of the tag 1, and the resonance frequency fd of the fourth resonance element 13Qd constituted by the fourth slot 13d does not constitute the identification information of the tag 1.

In addition, as can be seen from the reflection characteristics of FIG. 11, the Q value of the resonance peak at the resonance frequency fd of the resonance element 13Qd configured by the fourth slot 13d increases by disposing the fifth slot 13e. In this case, the resonance frequency fa of the first resonance element 13Qa, the resonance frequency fb of the second resonance element 13Qb, the resonance frequency fc of the third resonance element 13Qc, and the resonance frequency fd of the fourth resonance element 13Qd constitute identification information of the tag 1, and the resonance frequency fe of the fifth resonance element 13Qe constituted by the fifth slot 13e does not constitute identification information of the tag 1.

As described above, in the tag 1 according to the present embodiment, it is possible to increase the Q values at the resonance peaks of the resonance elements with other resonance frequencies while sacrificing the resonance element of the maximum resonance frequency. Note that the number of slots formed in the tag 1 is arbitrary as long as it is two or more.

[Effects]

As described above, the tag 1 according to the present embodiment includes a substrate 11 and a conductor pattern layer 12 formed on the substrate 11 and having the first and second slots (for example, 13a and 13b) disposed adjacent to each other, in which the first slot constitutes a first resonance element (for example, 13Qa) having a resonance frequency at a first frequency, the second slot constitutes a second resonance element (for example, 13Qb) having a resonance frequency at a second frequency higher than the first frequency, and when irradiation with the electromagnetic waves is performed, a Q value of a resonance peak appearing at the first frequency is higher than a Q value of a resonance peak appearing at the first frequency when the first slot alone constitutes a resonance structure of the tag.

Further, the tag 1 according to the present embodiment includes:

a substrate 11; and a conductor pattern layer 12 formed on the substrate 11 and having n (n is a positive integer of 3 or more) slots (for example, 13a, 13b, and 13c), in which the n slots constitute n resonance elements (for example, 13Qa, 13Qb, and 13Qc) having resonance frequencies different from each other, and are disposed adjacent to each other in such a manner that resonance lengths of the resonance elements are sequentially shortened, and when irradiation with the electromagnetic waves is performed, a Q value of a resonance peak appearing at a resonance frequency of a kth (k is an integer of 1 to n−1) resonance element counted from a resonance element with a longer length of the slot among the n resonance elements is higher than a Q value of a resonance peak appearing when a resonance structure of the tag is configured by the kth resonance element alone.

With the tag 1 of the present embodiment, it is possible to increase the Q value of the resonance peak at the resonance frequency (in the above embodiment, the frequencies fa and fb) constituting the identification information of the tag 1 more than in a case where each resonance element is disposed alone. That is, according to the tag 1 of the present embodiment, the SN ratio of the signal of the reflected wave at the resonance peak can be improved. Accordingly, reading accuracy of the identification information in the tag reader 2 can be improved.

Further, the tag 1 according to the present embodiment is also useful in that it is possible to increase the bits of the identification information configured by the tag 1 while suppressing the mounting area of the resonance element formed in the tag 1.

Second Embodiment

Next, a configuration of a tag 1 according to a second embodiment will be described with reference to FIGS. 12 to 16. The tag 1 according to the present embodiment is different from that of the first embodiment in that a resonance element is constituted by ring-shaped (and circular) slots instead of rectangular slots. Note that description of configurations common to the first embodiment will be omitted.

Figure 12A:
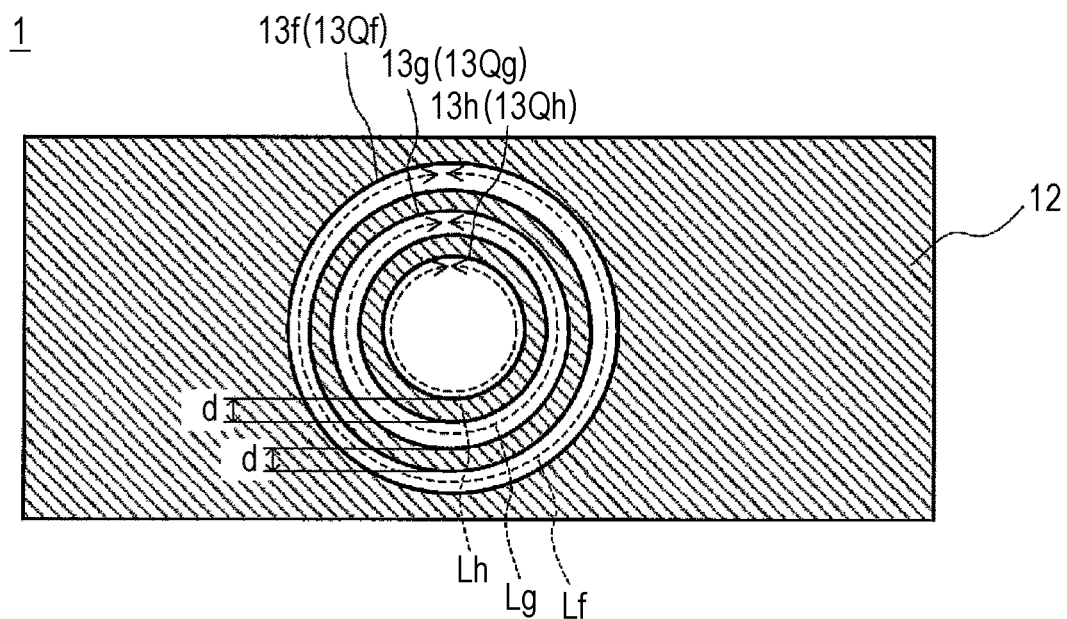
FIG. 12 is a diagram illustrating a configuration of a tag according to a second embodiment (FIG. 12A) and a reflection characteristic of the tag (FIG. 12B).
Figure 12B:
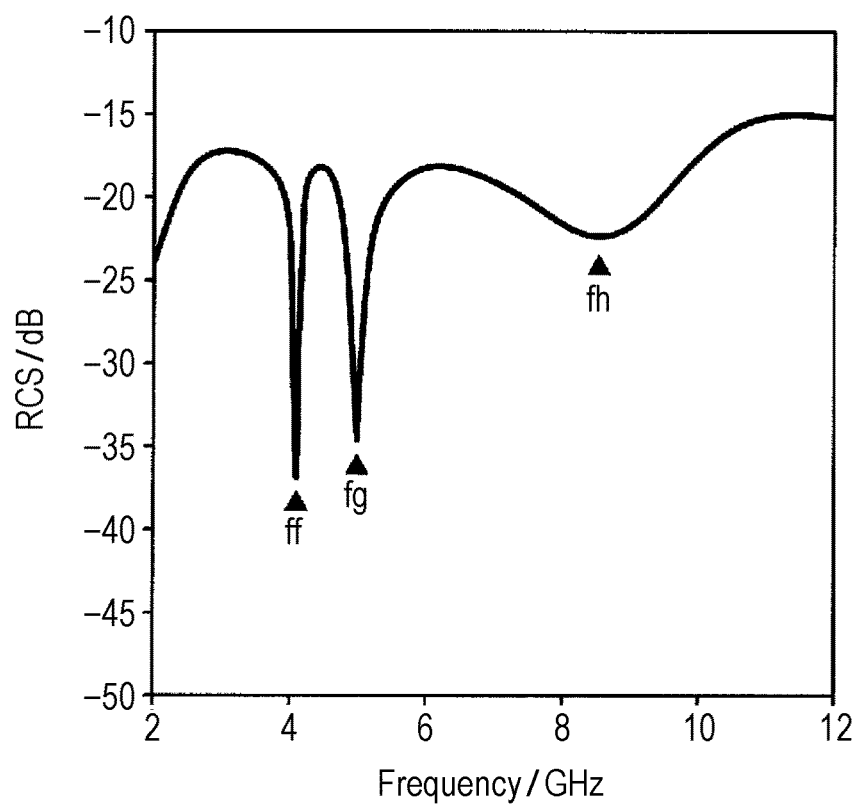

FIG. 12 is a diagram illustrating a configuration of the tag 1 according to the present embodiment (FIG. 12A) and a reflection characteristic of the tag 1 according to the present embodiment (FIG. 12B).

As in the first embodiment, the tag 1 according to the present embodiment includes a substrate 11 and a conductor pattern layer 12 disposed on the substrate 11. Three slots 13f, 13g, and 13h are formed in a conductor pattern layer 12. The slots 13f, 13g, and 13h constitute resonance elements 13Qf, 13Qg, and 13Qh having resonance frequencies different from each other.

Here, the slot 13f is formed in a ring shape and constitutes the resonance element 13Qf having a resonance frequency at a frequency ff corresponding to the ring length Lf (also referred to as a ring slot resonance element). Further, the slot 13g is formed in a ring shape and constitutes the resonance element 13Qg having a resonance frequency at a frequency fg corresponding to a ring length Lg. Furthermore, the slot 13h is formed in a circular shape and constitutes the resonance element 13Qh having a resonance frequency at a frequency fh corresponding to a ring length Lh corresponding to the circumferential length of the circular shape.

Note that the resonance elements 13Qf, 13Qg, and 13Qh typically resonate when the ring lengths Lf, Lg, and Lh correspond to one wavelength (hereinafter, the ring length is also referred to as a "resonance length").

The slots 13f, 13g, and 13h are disposed adjacent to each other, the slot 13g that is ring shaped is disposed inside the ring-shaped slot 13f, and the slot 13h that is circular is disposed inside the ring-shaped slot 13g. That is, the slots 13f, 13g, and 13h are concentrically disposed such that the ring length (resonance length) decreases in order from the outside toward the inside.

Also in the tag 1 according to the present embodiment, a sacrificial effect is exhibited similarly to the tag 1 according to the first embodiment. Specifically, also in the tag 1 according to the present embodiment, a sacrificial slot having a shorter length than the signal slot is disposed adjacent to the signal slot, so that a Q value of a resonance peak at a resonance frequency of the resonance element configured by the signal slot increases.

In the tag 1 according to the present embodiment, the slots 13f and 13g correspond to signal slots constituting identification information of the tag 1, and the slot 13h corresponds to a sacrificial slot not constituting identification information of the tag 1. That is, in the tag 1 according to the present embodiment, a phenomenon occurs in which a Q value of a resonance peak at the resonance frequency fg of the slot 13g increases due to the presence of the slot 13h and a Q value of a resonance peak at the resonance frequency ff of the slot 13f increases due to the presence of the slot 13g.

Note that the ratio of the length of the sacrificial slot to the length of the signal slot ($\mu$=Lf/Lg and Lg/Lh) is set to 0.70 or more and less than 1.0, similarly to the tag 1 according to the first embodiment. Further, the distance d between the signal slot and the sacrificial slot is set to λ/10 or less in the used frequency band, similarly to the tag 1 according to the first embodiment.

FIGS. 13 to 15 are comparative examples for explaining the sacrificial effect of the tag 1 according to the present embodiment.

Figure 13A:
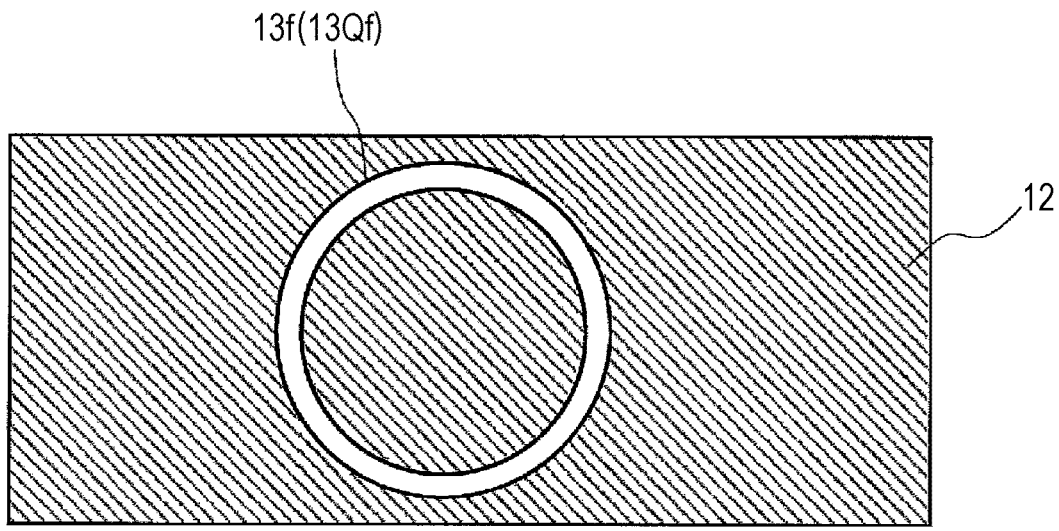
FIG. 13 is a diagram illustrating a configuration of comparative example 1 in which a conductor pattern layer has only one slot (FIG. 13A) and a reflection characteristic of comparative example 1 (FIG. 13B).
Figure 13B:
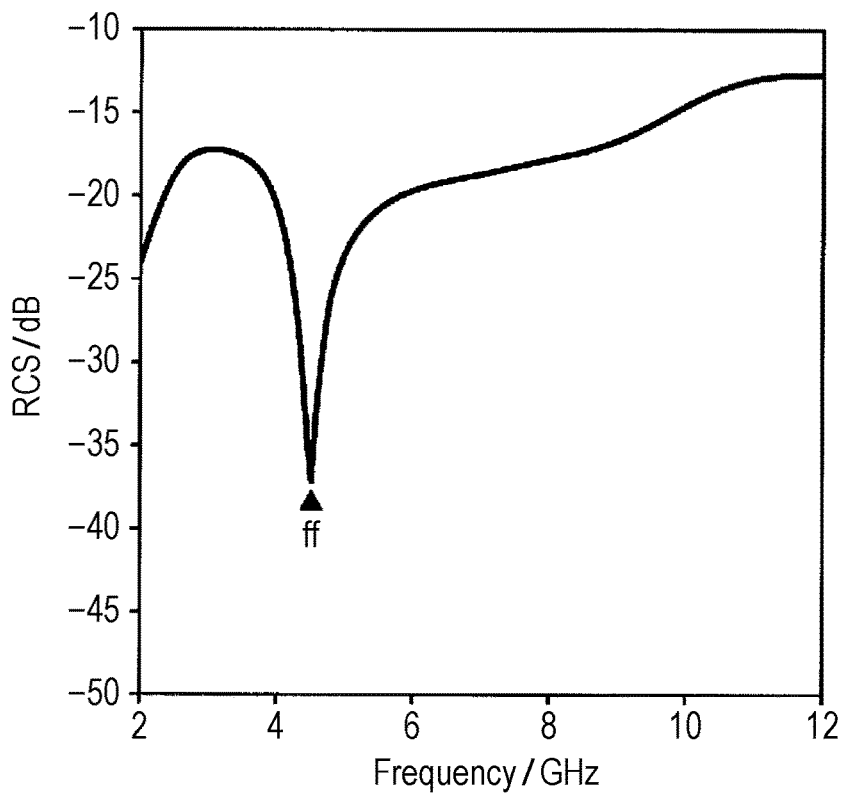
Figure 14A:
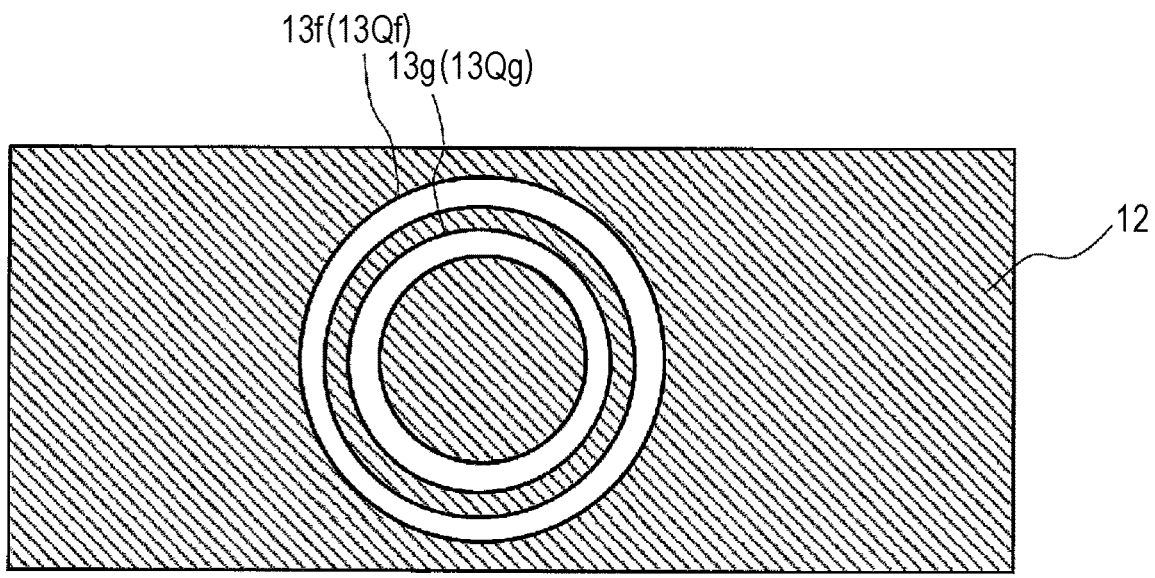
FIG. 14 is a diagram illustrating a configuration (FIG. 14A) of comparative example 2 in which the conductor pattern layer has only two slots and a reflection characteristic (FIG. 14B) of comparative example 2.
Figure 14B:
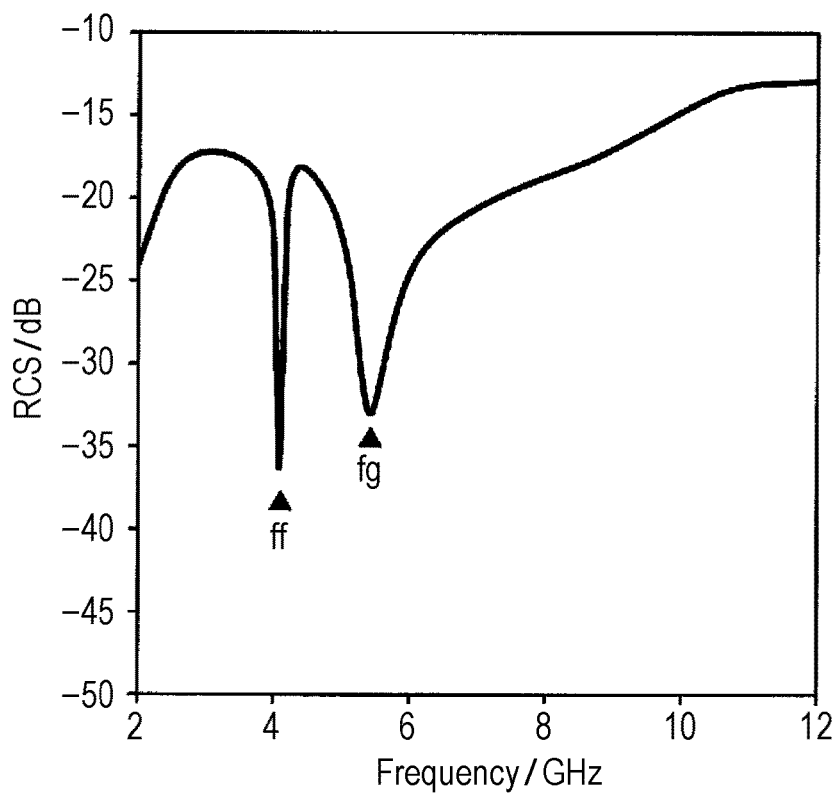
Figure 15A:
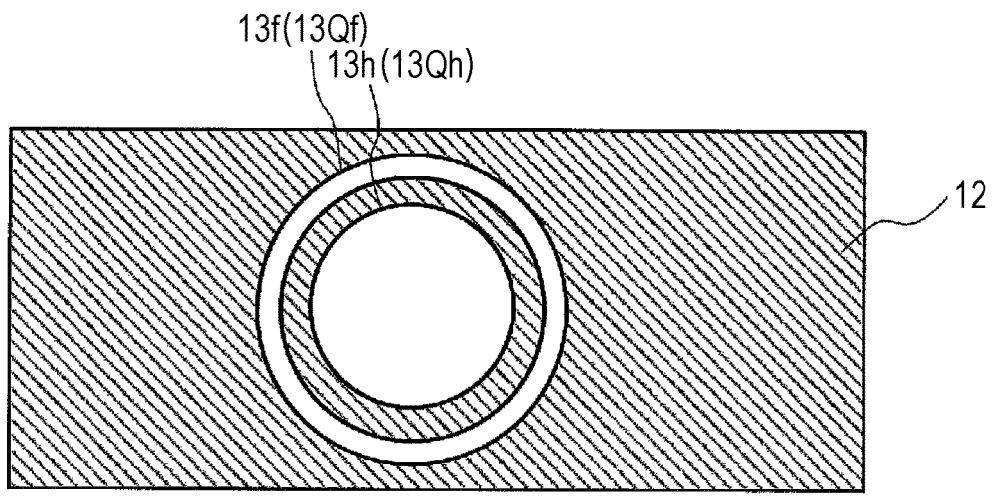
FIG. 15 is a diagram illustrating a configuration (FIG. 15A) of comparative example 3 in which the conductor pattern layer has only a slot 13$f$ and a slot 13$h$ and a reflection characteristic (FIG. 15B) of comparative example 3.
Figure 15B:
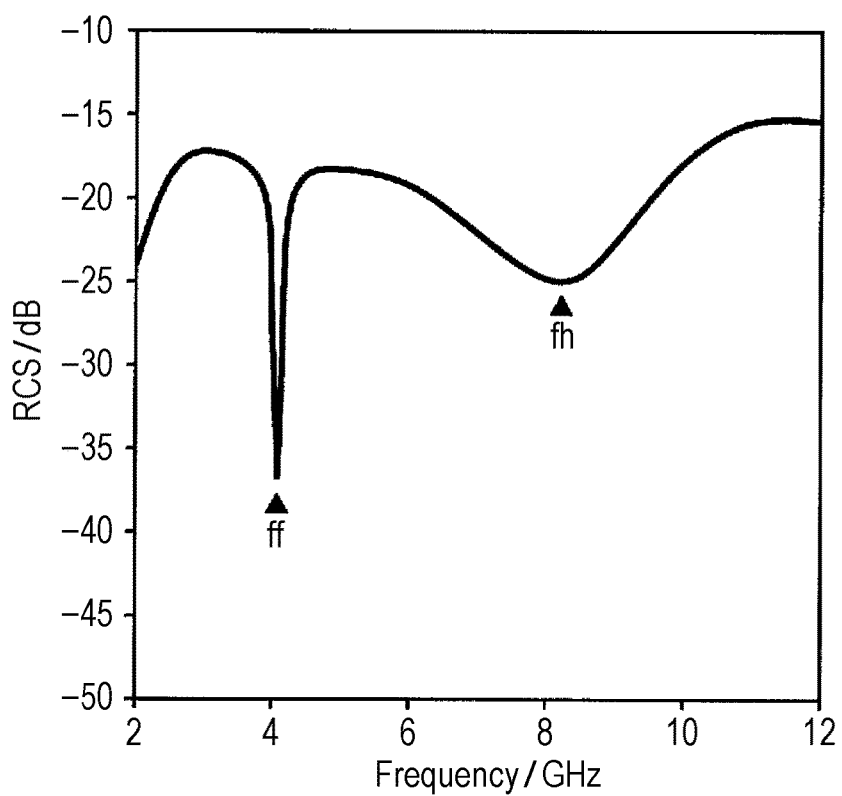

FIG. 13 is a diagram illustrating a configuration of comparative example 1 in which the conductor pattern layer 12 has only one slot 13f (FIG. 13A) and a reflection characteristic of comparative example 1 (FIG. 13B). FIG. 14 is a diagram illustrating a configuration (FIG. 14A) of comparative example 2 in which the conductor pattern layer 12 has only two slots 13f and 13g and a reflection characteristic (FIG. 14B) of comparative example 2. FIG. 15 is a diagram illustrating a configuration (FIG. 15A) of comparative example 3 in which the conductor pattern layer 12 has only two slots 13f and 13h and a reflection characteristic (FIG. 15B) of comparative example 3. Note that the reflection characteristics in FIGS. 13B, 14B, and 15B are calculated by electromagnetic field analysis simulation.

First, when the conductor pattern layer 12 includes only the slot 13f, a resonance peak is detected only at a frequency ff (resonance frequency of the resonance element 13Qf configured by the slot 13f) in the conductor pattern layer 12 (see FIG. 13B).

Then, when the slot 13g is formed in the conductor pattern layer 12 in addition to the slot 13f, a resonance peak is detected at the frequency fg (resonance frequency of the resonance element 13Qg configured by the slot 13g) in addition to the frequency ff in the conductor pattern layer 12 (see FIG. 14B). At this time, due to the sacrificial effect of the slot 13g, the Q value of the resonance peak at the frequency ff increases as compared with the case where the resonance structure is configured by the slot 13f alone (FIG. 13B).

Then, when the slot 13h is formed in the conductor pattern layer 12 in addition to the slot 13f, a resonance peak is detected at the frequency fh (resonance frequency of the resonance element 13Qh configured by the slot 13h) in addition to the frequency ff in the conductor pattern layer 12 (see FIG. 15B). At this time, due to the sacrificial effect of the slot 13h, the Q value of the resonance peak at the frequency ff increases as compared with the case where the resonance structure is configured by the slot 13f alone (FIG. 13B).

In comparative example 3, the Q value of the resonance peak at the frequency ff is slightly smaller than the Q value of the resonance peak at the frequency ff detected in comparative example 2. This is considered to be because, as described with reference to FIG. 9, the sacrificial effect decreases as the difference in resonance length between the adjacent slots increases.

Then, when the slots 13g and 13h are formed in the conductor pattern layer 12 in addition to the slot 13f, resonance peaks are detected at the frequency fg and the frequency fh in addition to the frequency ff in the conductor pattern layer 12 (see FIG. 15B). At this time, due to the sacrificial effect of the slot 13g, the Q value of the resonance peak at the frequency ff increases more than in the mode of FIG. 13B. In addition, due to the sacrificial effect of the slot 13h, the Q value of the resonance peak at the frequency fg increases more than in the mode of FIG. 14B. In other words, the Q value of the resonance peak at the frequency ff and the Q value of the resonance peak at the frequency fg increase more than the Q value of the resonance peak appearing at the frequency ff when the resonance structure of the tag 1 is configured by the slot 13f alone and the Q value of the resonance peak appearing at the frequency fg when the resonance structure of the tag 1 is configured by the slot 13g alone, respectively.

Figure 16A:
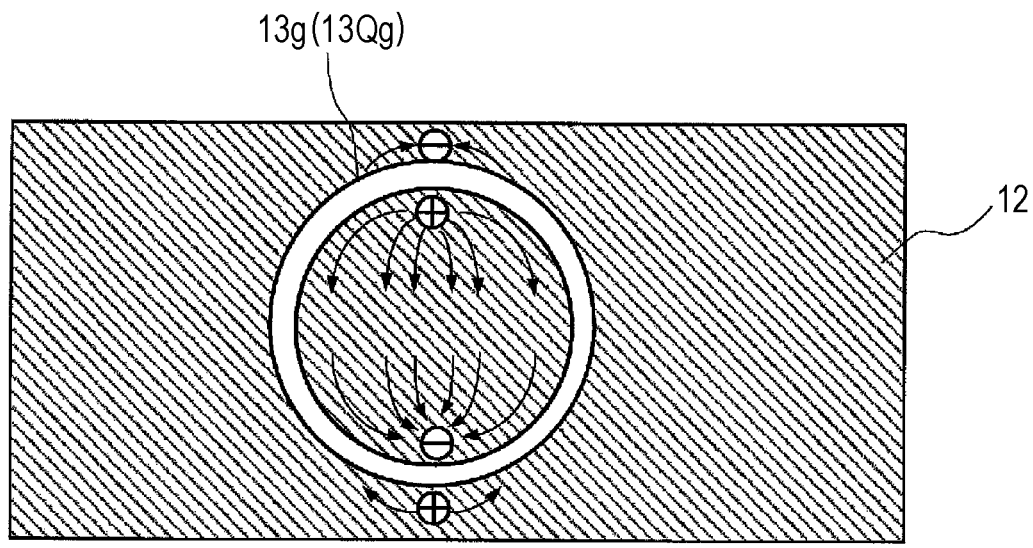
FIGS. 16A and 16B are diagrams for explaining the sacrificial effect in the tag according to the second embodiment.
Figure 16B:
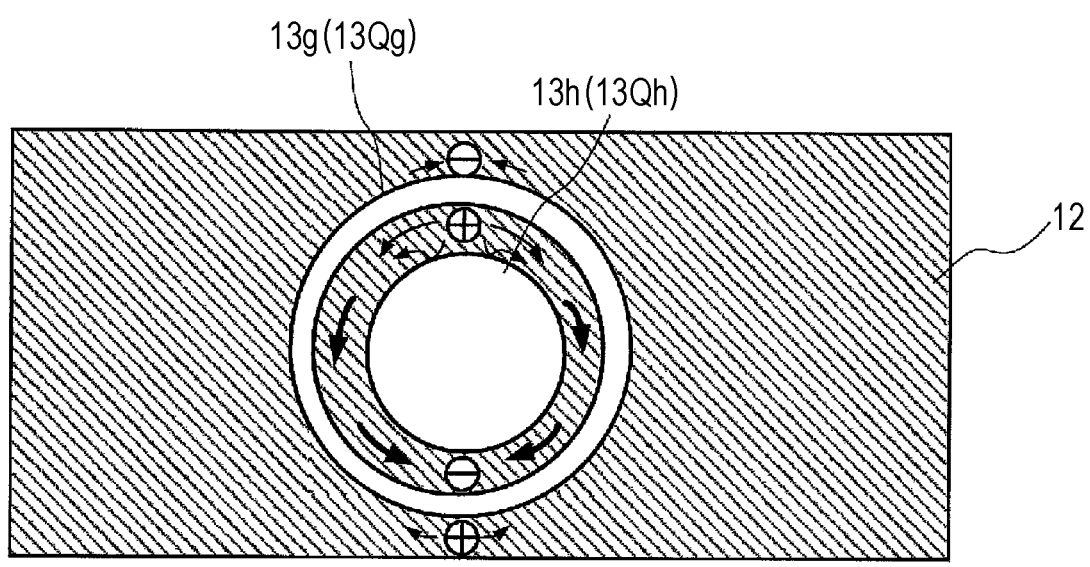

FIG. 16 is a diagram illustrating a sacrificial effect in the tag 1 according to the present embodiment. FIG. 16A illustrates current paths around a signal slot (here, the slot 13g) when the sacrificial slot (here, the slot 13h) is not present and FIG. 16B illustrates current paths around a signal slot (here, the slot 13g) when the sacrificial slot (here, the slot 13h) is present.

When the resonance element 13Qg resonates, at a certain time, the conductor pattern layer 12 is polarized across both ends of the slot 13g, and a resonance current flows so as to surround the periphery of the slot 13g.

At this time, in a case where there is no sacrificial slot (here, the slot 13h), the current flowing through the conductor pattern layer 12 takes any path as illustrated in FIG. 16A. As a result, the Q value of the resonance peak hardly increases.

On the other hand, when the sacrificial slot (here, the slot 13h) is present, the current flowing through the conductor pattern layer 12 is limited between the slot 13g and the slot 13h as illustrated in FIG. 16B. Consequently, the Q value of the resonance peak increases.

As described above, in the tag 1 according to the present embodiment, it is possible to increase the Q value of the resonance peak at the resonance frequency (in the above embodiment, the frequencies fa and fb) constituting the identification information of the tag 1 more than in a case where each resonance element is disposed alone.

In the above description, the mode in which the plurality of ring-shaped slots 13f and 13g are concentrically disposed so as to surround the circular slot 13h has been described. However, the tag 1 according to the present embodiment may be configured such that a circular slot is not disposed at the center and a plurality of ring-shaped slots is concentrically disposed (for example, the modes of FIG. 14A).

Third Embodiment

In the above embodiment, the mode in which the tag 1 is used as the identifier of the RFID system U has been described. However, the tag of the present invention can also be used as a chipless sensor tag (hereinafter, it is abbreviated as a "tag") of a state detection system that detects a state change of an object or an environment in a non-contact manner (see, for example, Patent Literature 2).

Figure 17:
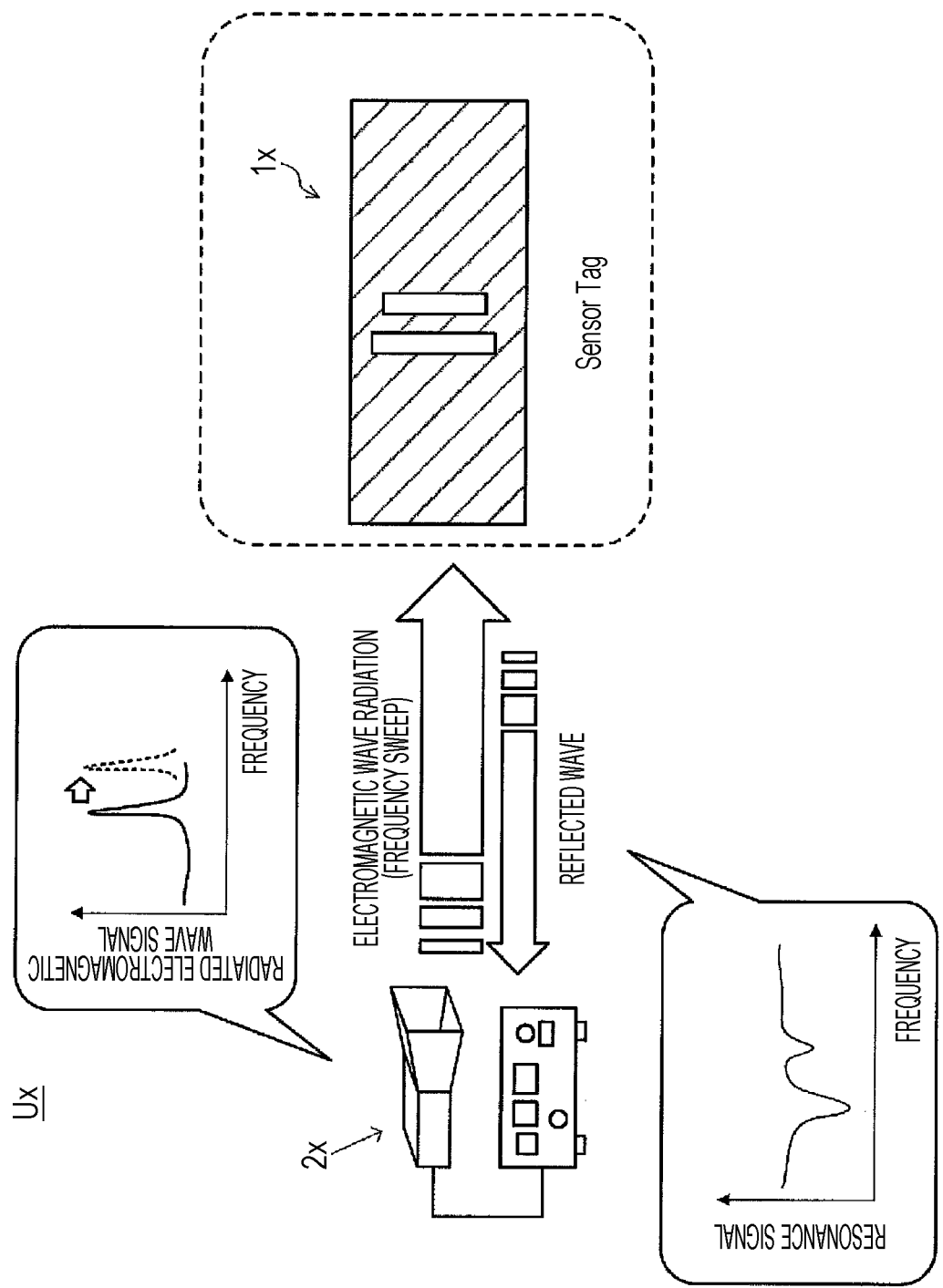
FIG. 17 is a diagram illustrating an example of a configuration of a state detection system according to a third embodiment.
Figure 18A:
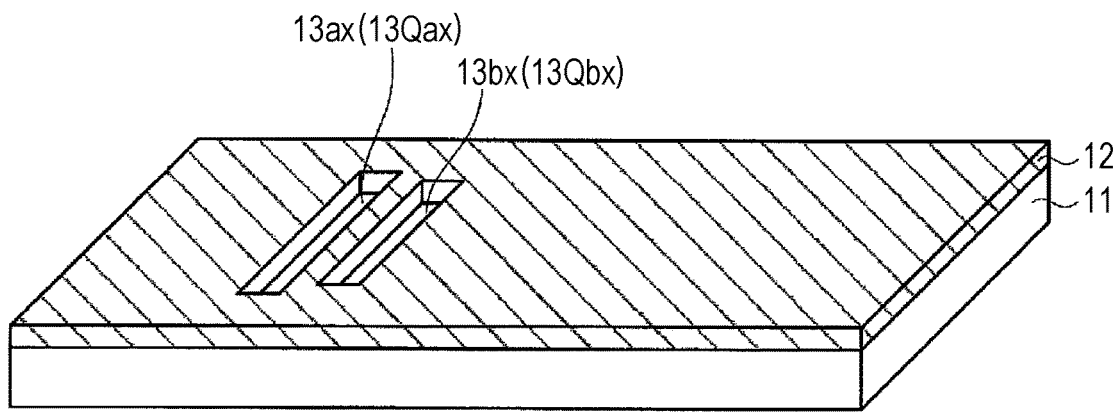
FIGS. 18A and 18B are views illustrating examples of a configuration of a tag according to the third embodiment.
Figure 18B:
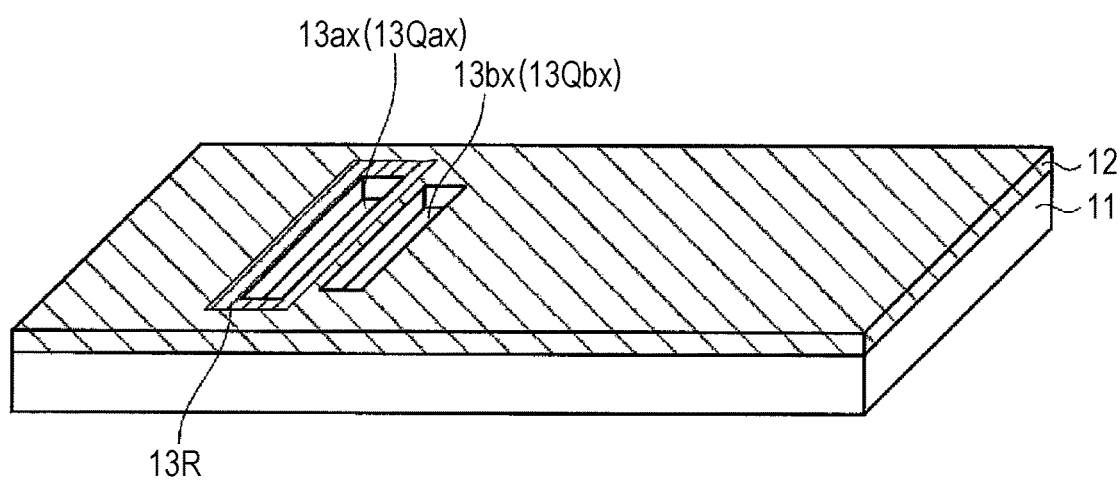

FIG. 17 is a diagram illustrating an example of a configuration of a state detection system Ux according to the present embodiment. FIG. 18 is a diagram illustrating an example of a configuration of a tag 1x according to the present embodiment. Note that FIG. 18A illustrates a basic configuration of the tag 1x, and FIG. 18B illustrates a modification example of the tag 1x.

The state detection system Ux includes a tag 1x and a tag reader 2x. The basic configurations of the tag 1x and the tag reader 2x are similar to the basic configurations of the tag 1 and the tag reader 2 according to the first embodiment.

The tag 1x has a plurality (two in FIGS. 18A and 18B) of slots 13ax and 13bx (that is, the resonance elements 13Qax and 13Qbx) disposed adjacent to each other and having different resonance lengths. Then, in FIGS. 18A and 18B, a slot 13ax having a long resonance length constitutes a signal slot, and a slot 13bx having a short resonance length constitutes a sacrificial slot.

Here, the tag 1x is configured such that at least the slot 13ax constituting the signal slot responds to a state change of a surrounding environment of the detection target. That is, the tag 1x changes its own electromagnetic wave reflection characteristic according to a state change of the surrounding environment of the detection target.

Examples of the state change as a detection target by the tag 1x include a change in a position of an object around the tag 1x, a change in a form of an object around the tag 1x, a change in moisture content of an object around the tag 1x, a change in humidity of the surrounding environment of the tag 1x, a change in temperature of the surrounding environment of the tag 1x, a change in gas concentration of the surrounding environment of the tag 1x, a change in light illuminance of the surrounding environment of the tag 1x, a change in pH of the surrounding environment of the tag 1x, a change in a magnetic field of the surrounding environment of the tag 1x, a change in a degree of oxidation of an object around the tag 1x, and the like.

The tag reader 2x transmits the electromagnetic waves to the tag 1x while changing the transmission frequency, receives the reflected waves, and acquires data of the current reflected wave spectrum of the tag 1x. Then, the tag reader 2x estimates the current state of the detection target on the basis of the data of the current reflected wave spectrum (that is, the electromagnetic wave reflection characteristic) of the tag 1x.

Figure 19A:
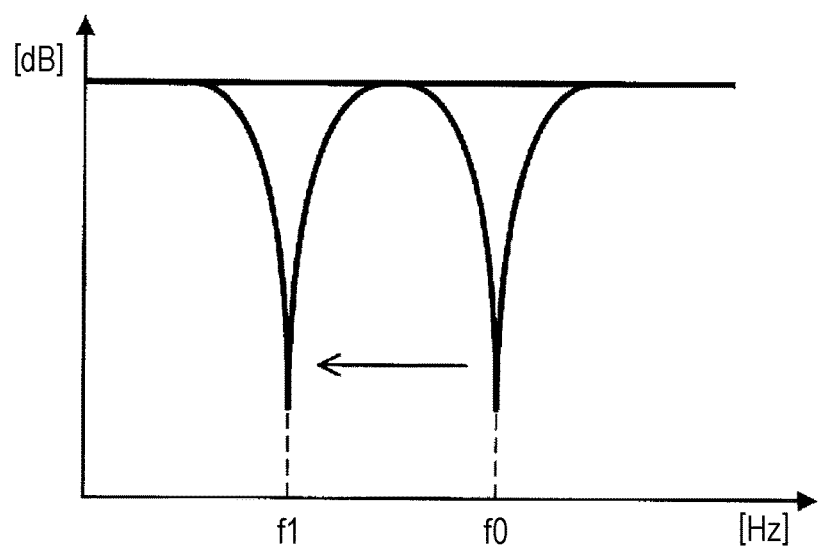
FIGS. 19A, 19B, and 19C are diagrams illustrating an example of a change in a reflected wave spectrum of a tag caused by a state change of a detection target of the tag.
Figure 19B:
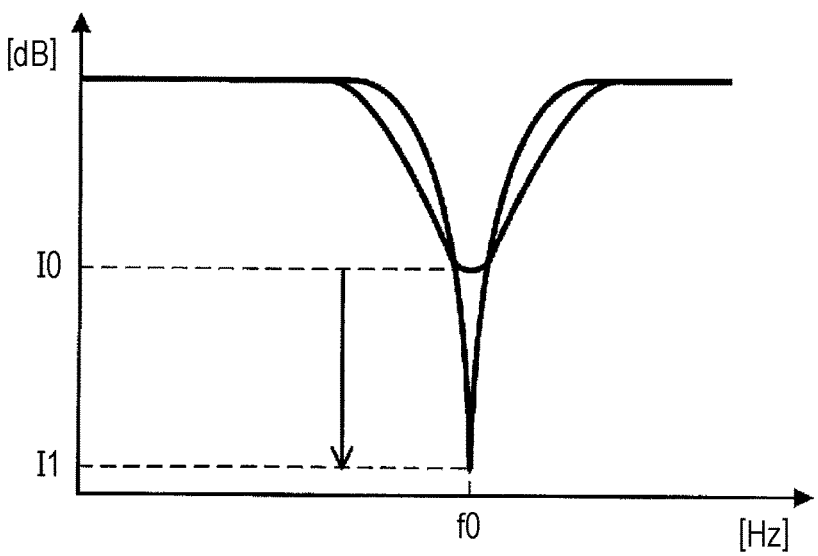
Figure 19C:
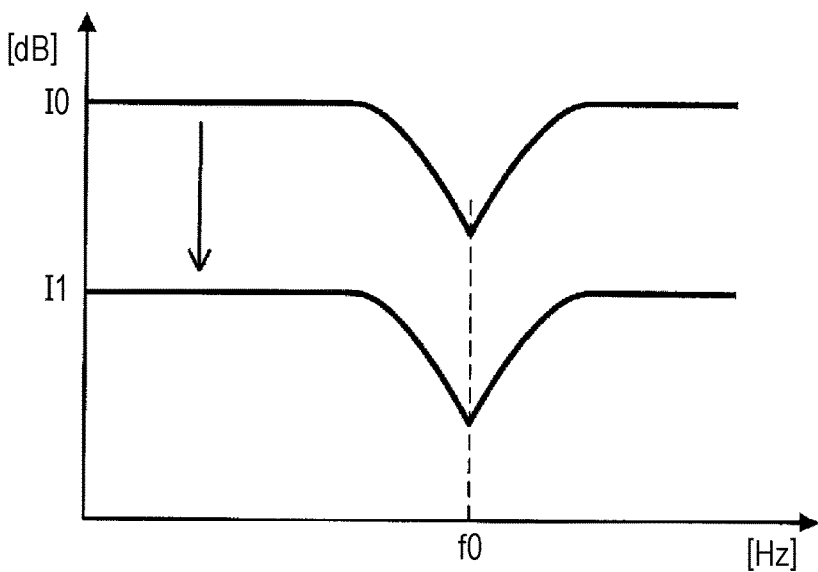

FIG. 19 is a diagram illustrating an example of a change in the reflected wave spectrum of the tag 1x caused by a state change of the detection target of the tag 1x. The state of the detection target is detected as a change in a reflected wave spectrum accompanying a change in dielectric constant around the tag 1x (that is, the resonance element 13Qax) and a change in conductivity around the tag 1x (that is, the resonance element 13Qax). At this time, the state of the detection target is typically detected as a change in resonance peak position (that is, the resonance frequency) (see FIG. 19A), a change in peak intensity of the resonance peak (see FIG. 19B), or a change in reflection intensity of a baseband region (see FIG. 19C) in the reflected wave spectrum of the tag 1x. That is, the tag reader 2x estimates the state change of the detection target on the basis of presence or absence of a resonance peak, attenuation of the resonance peak, a shift of the resonance peak, a change in a peak shape of the resonance peak, and the like.

In such a configuration, the state detection system U can estimate the current state of the detection target of the tag 1x with high accuracy from the change in the electromagnetic wave reflection characteristic of the tag 1x.

As illustrated in FIG. 18B, the tag 1x preferably has a stimulus-responsive part 13x having good responsiveness to a state change of the detection target around the slot 13ax. Note that, as illustrated in FIG. 18B, the stimulus-responsive part 13x may be formed in the conductor pattern layer 12, but the formation position thereof is arbitrary as long as it is possible to affect frequency characteristics of the slot 13ax. For example, the stimulus-responsive part 13x may be provided to cover the slot 13ax.

Examples of the stimulus-responsive part 13x for detecting a temperature change include a low-melting material provided so as to cover the resonance element 13Qax. Since the low-melting material melts when a certain temperature is reached, the low-melting material leads to a change in dielectric constant around the tag 1x so as to respond to a change in temperature around the tag 1x (see FIG. 19A). That is, since a change appears in the resonance characteristic of the resonance element 13Qax, the temperature can be detected more easily from the electromagnetic wave reflection characteristic of the tag 1x.

Examples of the stimulus-responsive part 13x for detecting a change in gas concentration include a silver ink layer formed at a peripheral portion of the resonance element 13Qax. The silver ink layer changes in conductivity when exposed to corrosive gas, thus resulting in a change in the peak intensity of the resonance peak of the resonance element 13Qax in response to a change in gas concentration around the tag 1x (see FIG. 19B). That is, since a change appears in the resonance characteristic of the resonance element 13Qax, it is possible to more easily detect a gas concentration change from the electromagnetic wave reflection characteristic of the tag 1x.

Examples of the stimulus-responsive part 13x for detecting pressure or strain include an anisotropic conductive film formed at a peripheral part of the resonance element 13Qax. When a pressure is applied, the anisotropic conductive film forms a conductive path in a region to which the pressure is applied, and thus causes a change in the peak intensity of the resonance peak of the resonance element 13Qax or the reflection intensity of the baseband region so as to respond to a change in pressure around the tag 1x (See FIGS. 19B and 19C). That is, a change appears in the resonance characteristic of the resonance element 13Qax, and thus it is possible to more easily detect pressure or distortion from the electromagnetic wave reflection characteristic of the tag 1x.

Examples of the stimulus-responsive part 13x for detecting humidity include a water-absorbing polymer formed at a peripheral portion of the resonance element 13Qax. The water-absorbing polymer brings about a change in dielectric constant around the tag 1x so as to respond to a humidity change of the surrounding environment of the tag 1x in order to maintain a water absorption amount according to the humidity of the surrounding environment (see FIG. 19A). That is, since a change appears in the resonance characteristic of the resonance element 13Qax, the humidity can be more easily detected from the electromagnetic wave reflection characteristic of the tag 1x.

As described above, the tag of the present invention can also be used as a chipless sensor tag of the state detection system that detects a state change of an object or an environment in a non-contact manner. At this time, by providing the sacrificial slot 13bx in the chipless sensor tag, the SN ratio of the signal of the reflected wave at the resonance peak of the signal slot 13ax can be improved. This makes it possible to construct a more sensitive state detection system.

Other Embodiments

The present invention is not limited to the above embodiment, and various modifications are conceivable.

In the above embodiment, as an example of the slot formed in the tag 1, a rectangular slot and a ring-shaped slot are illustrated. However, the shape of the slot of the present invention is also applicable to other shapes. Further, it may be in a mode in which the entire periphery of the slot is not necessarily surrounded by the conductor, and for example, one side in a lateral direction of the rectangular slot is not be surrounded by the conductor.

Although specific examples of the present invention have been described in detail above, these are merely examples and do not limit the scope of claims. The technology described in the claims includes various modifications and changes of the specific examples exemplified above.

The entire disclosure of the description, drawings, and abstract included in Japanese Patent Application No. 2019-154062 filed on Aug. 26, 2019 is incorporated herein by reference.

INDUSTRIAL APPLICABILITY

With a tag of the present disclosure, the SN ratio of a signal of a reflected wave at a resonance peak can be improved.

REFERENCE SIGNS LIST

U RFID system
Ux state detection system
1 chipless RFID tag
1x chipless sensor tag
11 substrate
12 conductor pattern layer
13a, 13b, 13c, 13d, 13e slot
13Qa, 13Qb, 13Qc, 13Qd, 13Qe resonance element
2 tag reader
2x tag reader
20 control unit
20a drive unit
20b resonance frequency detection unit
20c identification information reading unit
21 antenna unit
22 operation input unit
23 display unit
24 storage unit

The invention claimed is:

1. A tag indicating an attribute of the tag by an electromagnetic wave reflection characteristic, the tag comprising:
a substrate; and
a conductor pattern layer formed on the substrate and having first and second slots disposed adjacent to each other,
wherein the first slot constitutes a first resonance element having a resonance frequency at a first frequency,
the second slot constitutes a second resonance element having a resonance frequency at a second frequency higher than the first frequency, and
when irradiation with electromagnetic waves is performed, a Q value of a resonance peak appearing at the first frequency is higher than a Q value of a resonance peak appearing at the first frequency when the first slot alone constitutes a resonance structure of the tag.

2. A tag indicating an attribute of the tag by an electromagnetic wave reflection characteristic, the tag comprising:
a substrate; and
a conductor pattern layer formed on the substrate and having n (n is a positive integer of 3 or more) slots,
wherein the n slots
constitute n resonance elements having resonance frequencies different from each other, and are disposed adjacent to each other in such a manner that resonance lengths of the resonance elements are sequentially shortened, and
when irradiation with the electromagnetic waves is performed, a Q value of a resonance peak appearing at a resonance frequency of a kth (k is an integer of 1 to n−1) resonance element counted from a resonance element with a longer length of the slot among the n resonance elements is higher than a Q value of a resonance peak appearing when a resonance structure of the tag is configured by the kth resonance element alone.

3. The tag according to claim 2, wherein
the identification information includes n−1 resonance frequencies excluding a maximum resonance frequency among resonance frequencies of the n resonance elements.

4. The tag according to claim 2, wherein
when irradiation with the electromagnetic waves is performed, the Q value of the resonance peak appearing at the resonance frequency of the kth resonance element counted from the resonance element with the longer length of the slot among the n resonance elements is 1.5 times or more the Q value of the resonance peak appearing when the resonance structure of the tag is constituted by the kth resonance element alone.

5. The tag according to claim 2, wherein
when irradiation with the electromagnetic waves is performed, the Q value of the resonance peak appearing at the resonance frequency of the kth resonance element counted from the resonance element with the longer length of the slot among the n resonance elements is four times or more the Q value of the resonance peak appearing when the resonance structure of the tag is constituted by the kth resonance element alone.

6. The tag according to claim 2, wherein
the n slots each have a rectangular shape, and are disposed substantially in parallel so that longitudinal directions of the rectangular shapes face each other.

7. The tag according to claim 6, wherein
the n slots are disposed in such a manner that center positions in a longitudinal direction are aligned.

8. The tag according to claim 2, wherein
each of the n slots has a ring shape, and
the n slots are disposed concentrically.

9. The tag according to claim 2, wherein
the n slots include one circular slot and n−1 ring-shaped slots,
the n−1 ring-shaped slots are concentrically disposed so as to surround the circular slot.

10. The tag according to claim 2, wherein
a ratio of lengths of two slots disposed adjacent to each other among the n slots is 0.70 or more and less than 1.0.

11. The tag according to claim 2, wherein
an interval between two adjacent slots of the n slots is $\lambda/10$ or less in a frequency band of the electromagnetic waves.

12. The tag according to claim 2, wherein
the conductor pattern layer is a coating layer formed by a printing method.

13. The tag according to claim 2, wherein
the conductor pattern layer is a metal foil layer formed by a foil transfer method.

14. The tag according to claim 2, wherein
the substrate is a printed matter, and
the conductor pattern layer is formed on a surface opposite to a printing surface of the printed matter.

15. The tag according to claim 2, wherein
the tag is applied to a chipless RFID tag indicating identification information attached to the chipless RFID tag by the electromagnetic wave reflection characteristic.

16. The tag according to claim 2, wherein
the tag is applied to a chipless sensor tag that detects a state change of a surrounding object or a surrounding environment by the electromagnetic wave reflection characteristic.

17. The tag according to claim 3, wherein
when irradiation with the electromagnetic waves is performed, the Q value of the resonance peak appearing at the resonance frequency of the kth resonance element counted from the resonance element with the longer length of the slot among the n resonance elements is 1.5 times or more the Q value of the resonance peak appearing when the resonance structure of the tag is constituted by the kth resonance element alone.

18. The tag according to claim 3, wherein
when irradiation with the electromagnetic waves is performed, the Q value of the resonance peak appearing at the resonance frequency of the kth resonance element counted from the resonance element with the longer length of the slot among the n resonance elements is four times or more the Q value of the resonance peak appearing when the resonance structure of the tag is constituted by the kth resonance element alone.

19. The tag according to claim 3, wherein
the n slots each have a rectangular shape, and are disposed substantially in parallel so that longitudinal directions of the rectangular shapes face each other.

20. The tag according to claim 3, wherein
each of the n slots has a ring shape, and
the n slots are disposed concentrically.

* * * * *